(12) United States Patent
Takahashi

(10) Patent No.: US 6,867,882 B1
(45) Date of Patent: Mar. 15, 2005

(54) IMAGE INPUTTING APPARATUS AND ITS CONTROL METHOD, INFORMATION PROCESSING APPARATUS AND METHOD, AND PRINT SYSTEM

(75) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 09/598,767

(22) Filed: Jun. 22, 2000

(30) Foreign Application Priority Data

Jun. 30, 1999 (JP) .......................................... 11-186880

(51) Int. Cl.7 .......................... G06F 15/00; H04N 5/225
(52) U.S. Cl. ........................ 358/1.6; 358/1.15; 358/1.9; 348/207.2; 348/207.11
(58) Field of Search ................................. 358/1.15, 1.6, 358/1.9, 1.5; 348/207.2, 207.11, 232, 239

(56) References Cited

U.S. PATENT DOCUMENTS

| | | | | |
|---|---|---|---|---|
| 5,477,264 A | * | 12/1995 | Sarbadhikari et al. | ... 348/231.6 |
| 6,074,111 A | * | 6/2000 | Kasahara | ..................... 400/76 |
| 6,115,137 A | * | 9/2000 | Ozawa et al. | ................. 358/1.6 |
| 6,201,571 B1 | * | 3/2001 | Ota | ............................. 348/239 |
| 6,441,850 B1 | * | 8/2002 | Dotsubo et al. | ............ 348/239 |
| 6,504,960 B2 | * | 1/2003 | Takahashi | ................... 382/305 |
| 6,577,338 B1 | * | 6/2003 | Tanaka et al. | ........... 348/207.2 |
| 6,597,468 B1 | * | 7/2003 | Inuiya | ....................... 358/1.15 |

* cited by examiner

*Primary Examiner*—Edward Coles
*Assistant Examiner*—Chan S. Park
(74) *Attorney, Agent, or Firm*—Fitzpatrick, Cella, Harper & Scinto

(57) ABSTRACT

In a print system which has a digital still camera, computer, and printer, it is difficult for a user who is not accustomed to the computer to operate the computer. A direct printer is expensive since the printer itself requires a controller, a digital signal processor for image processes, a module for communicating with the image inputting apparatus, and the like. To combat this problem, an image inputting apparatus transmits a print execution instruction and an image to be printed to an information processing apparatus upon inputting a print request of a sensed image or an image stored in a memory. Upon receiving the print execution instruction and the image to be printed, the information processing apparatus issues a print request of the received image to a connected printer apparatus, and transmits the received image.

23 Claims, 27 Drawing Sheets

FIG. 14

| INDEX | IMAGE ID |
|---|---|
| 1 | IMAGE 1 |
| 2 | IMAGE 2 |
| 3 | IMAGE 3 |
| 4 | IMAGE 4 |
| 5 | IMAGE 5 |

FIG. 17

| INDEX | POSITION | COORDINATE (mm) |
|---|---|---|
| 1 | UPPER LEFT X | 40 |
| | UPPER LEFT Y | 40 |
| | LOWER RIGHT X | 100 |
| | LOWER RIGHT Y | 80 |
| 2 | UPPER LEFT X | 130 |
| | UPPER LEFT Y | 80 |
| | LOWER RIGHT X | 180 |
| | LOWER RIGHT Y | 120 |
| 3 | UPPER LEFT X | 200 |
| | UPPER LEFT Y | 40 |
| | LOWER RIGHT X | 260 |
| | LOWER RIGHT Y | 80 |
| 4 | UPPER LEFT X | 40 |
| | UPPER LEFT Y | 120 |
| | LOWER RIGHT X | 80 |
| | LOWER RIGHT Y | 170 |
| 5 | UPPER LEFT X | 200 |
| | UPPER LEFT Y | 120 |
| | LOWER RIGHT X | 260 |
| | LOWER RIGHT Y | 160 |

IMAGE INPUTTING APPARATUS AND ITS CONTROL METHOD, INFORMATION PROCESSING APPARATUS AND METHOD, AND PRINT SYSTEM

FIELD OF THE INVENTION

The present invention relates to an image inputting apparatus and its control method, an information processing apparatus and method, and a print system and, more particularly, to an image inputting apparatus control method for printing an image captured by an image inputting apparatus such as a digital still camera or the like, an information processing apparatus and method, and a print system.

BACKGROUND OF THE INVENTION

In a print system which is constructed by an image inputting apparatus such as a digital still camera or the like, a host information processing apparatus such as a personal computer, and a printer, the user must execute the following procedures upon printing image data captured by image sensing.

(1) The user connects the computer and image inputting apparatus via a serial cable or the like, transfers the sensed image to the computer, and stores the transferred image in a hard disk or the like as an image data file.

(2) The user launches photoretouch software.

(3) The user opens the image data file stored in the hard disk or the like from the photoretouch software.

(4) The user selects "print" from the menu of the photoretouch software to command the printer to print an image represented by the image data file which is open currently.

In such a print system, it is difficult for a user who is not accustomed to the computer to operate the computer, and such user cannot often complete the aforementioned operation procedures. In consideration of such problem, a printer called a "direct printer" has been developed. The direct printer can be directly connected to the image inputting apparatus, and a sensed image can be printed simply by operating only the image inputting apparatus and printer. For this reason, even a user who is not accustomed to the computer can easily print the sensed image.

However, the direct printer is expensive since the printer itself requires a controller, a digital signal processor (DSP) for image processes, a module for communicating with the image inputting apparatus, and the like. Furthermore, the communication module must match or comply with the communication protocol of the image inputting apparatus, and image inputting apparatuses with which the direct printer can communicate are limited.

Furthermore, when the printer itself makes image processes such as color correction, dithering, color pallet formation, lightness correction, gain correction of color components, contrast correction, color temperature correction, gamma correction, and the like, it requires a high-speed arithmetic device and a large memory size to achieve high print speed, thus considerably increasing the printer cost.

SUMMARY OF THE INVENTION

The present invention has been made to solve the aforementioned problems, and has as its object to provide an image inputting apparatus and its control method, an information processing apparatus and method, and a print system, which can easily print a captured or stored image, and can reduce the cost.

In order to achieve the above object, a preferred embodiment of the present invention discloses an image inputting apparatus comprising: capture means for capturing an image; storage control means for storing the captured image in a memory; communication means for communicating with an information processing apparatus to which a printer apparatus is connected; and inputting means for inputting a print request of the captured or stored image, wherein the communication means transmits a print execution instruction and an image to be printed to the information processing apparatus when the inputting means inputs the print request.

A preferred embodiment of the present invention discloses an information processing apparatus comprising: communication means for receiving a print execution instruction and an image to be printed from an image inputting apparatus; and control means for issuing a print request of the received image to a connected printer apparatus, and transmitting the image to be printed.

A preferred embodiment of the present invention discloses a printing system comprising an image inputting apparatus and an information processing apparatus, wherein the image inputting apparatus comprises capture means for capturing an image, storage control means for storing the image captured by the capture means in a memory, first communication means for communicating with the information processing apparatus, and inputting means for inputting a print request of the captured or stored image, and the information processing apparatus comprises second communication means for receiving the print execution instruction and the image to be printed, and control means for issuing a print request of the received image to a connected printer apparatus, and transmitting the received image, wherein the first and second communication means execute a communication for exchanging the print execution instruction and the image to be printed when said inputting means inputs the print request.

A preferred embodiment of the present invention discloses a controlling method of an image inputting apparatus which comprises capture means for capturing an image, storage control means for storing the image captured by said capture means in a memory, and communication means for communicating with an information processing apparatus to which a printer apparatus is connected, said method comprising the steps of: inputting a print request of the image captured by said capture means or stored in the memory; and transmitting a print execution instruction and an image to be printed to the information processing apparatus using the communication means on the basis of the print request.

A preferred embodiment of the present invention discloses an information processing method comprising the steps of: receiving a print execution instruction and an image to be printed from an image inputting apparatus; issuing a print request of the received image to a connected printer apparatus; and transmitting the image to be printed to the printer apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 shows the memory map in a print image ID memory;

FIG. 17 shows the memory map in a print layout memory;

DESCRIPTION OF THE PREFERRED EMBODIMENTS

An image inputting apparatus, information processing apparatus, and print system according to preferred embodiments of the present invention will be described in detail hereinafter with reference to the accompanying drawings.

[First Embodiment]

<Outline>

Figure 1:
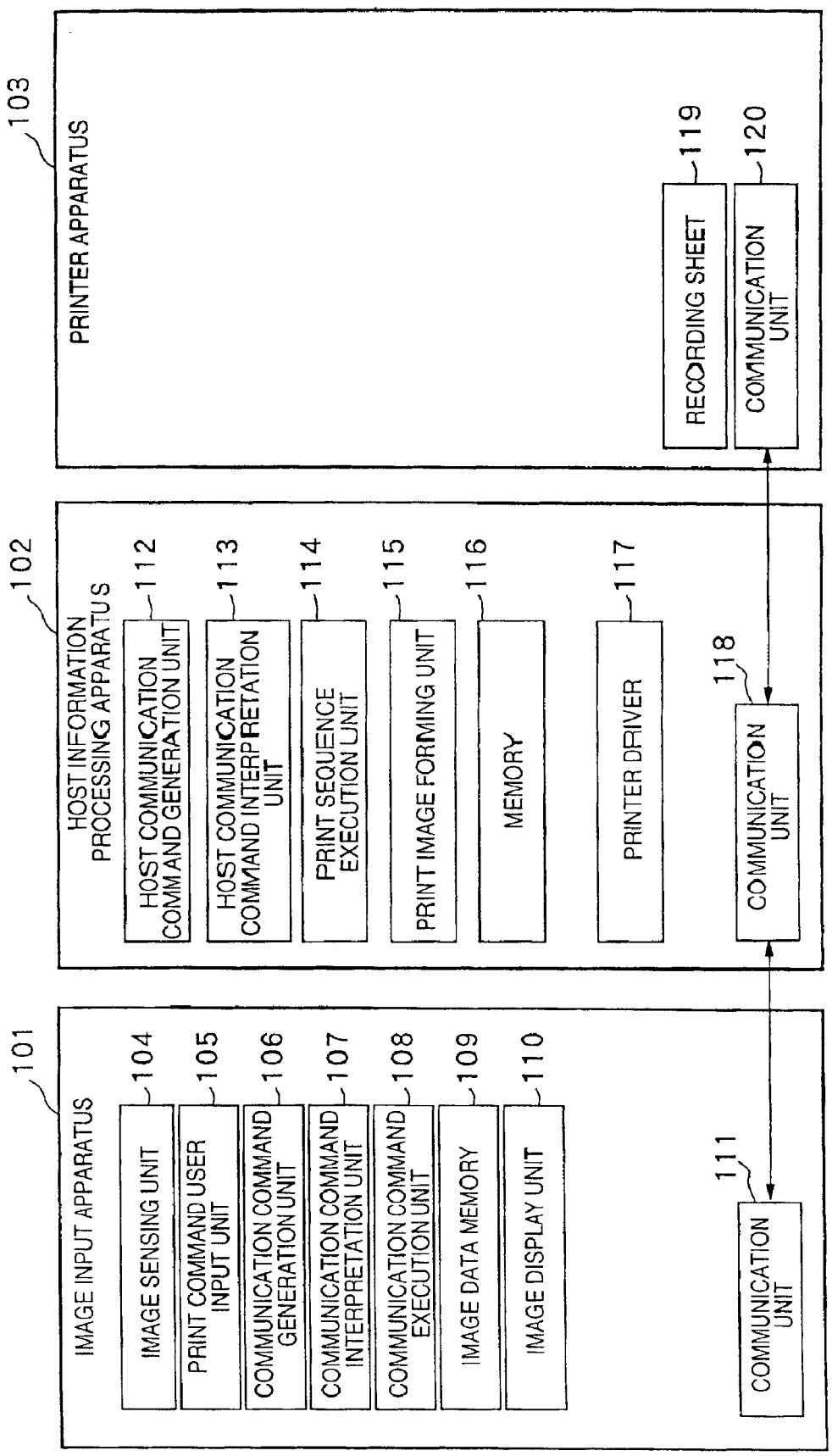
FIG. 1 is a block diagram showing the arrangement of an image inputting apparatus and print system according to the first embodiment of the present invention.

FIG. 1 is a block diagram showing the arrangement of an image inputting apparatus and print system according to an embodiment of the present invention. The image inputting apparatus and print system of the first embodiment will be explained below with reference to FIG. 1.

As shown in FIG. 1, an image inputting apparatus 101 comprises an image sensing unit 104 which senses an image in accordance with an instruction input by the user, and stores the sensed image in an image data memory 109, a print command user input unit 105 which receives a print request input by the user, a communication command generation unit 106 which generates a print command with a predetermined format in accordance with a print request input by the user, a communication unit 111 which transmits the generated print command to a host information processing apparatus 102 connected to the apparatus 101, an image display unit 110 which displays image data stored in the image data memory 109 and other kinds of information in accordance with a user's request, a communication command interpretation unit 107 for interpreting a communication command received from the host information processing apparatus 102, and a communication execution unit 108 for executing a process corresponding to a command in accordance with the interpretation result of the communication command interpretation unit 107.

The host information processing apparatus 102 comprises a communication unit 118 for exchanging commands and data with the image inputting apparatus 101 and a printer apparatus 103, a host communication command interpretation unit 113 for interpreting a command received from the image inputting apparatus 101, a host communication command generation unit 112 for generating a command to be transmitted to the image inputting apparatus 101, a print sequence execution unit 114 for executing a print sequence when the interpretation result of the host communication command interpretation unit 113 indicates a command that requests a print process, a print image forming unit 115 for forming a print image to be printed on a recording sheet 119 on the basis of print image data received from the image inputting apparatus 101, a memory 116 for storing received print image data, a print image, and other kinds of information, and a printer driver 117 for driving the printer apparatus 103 in accordance with the protocol with the printer apparatus 103, and transmitting the print image formed by the print image forming unit 115 to the printer apparatus 103 via the communication unit 118.

Note that currently available printers incorporate printer drivers (software) for the operating systems (OSs) of personal computers (PCs) to which those printers are connected. For this reason, application software which runs on a PC can print an image or the like by launching and controlling a printer driver via an application program interface (API) of the OS irrespective of the low-level communication protocol with the printer apparatus. That is, the printer driver 117 shown in FIG. 1 can be such general printer driver. On the other hand, the printer apparatus 103 visualizes a print image received via a communication unit 120 on the recording sheet 119, and can be a printer which is prevalent currently.

In the above arrangement, when the user wants to print one or more sensed images, he or she inputs a print request at the print command user input unit 105. In response to this request, the communication command generation unit 106 generates a print request command complying with the protocol with the host communication command interpretation unit 113, and transmits that command via the communication unit 111. In the host information processing apparatus 102, the host communication command interpretation unit 113 interprets the command received via the communication unit 118, and the print sequence execution unit 114 executes the print sequence. When a plurality of images are stored in the image data memory 109, an image currently displayed on the image display unit 110 may be selected as an image to be printed. Also, by operating the image inputting apparatus 101 in advance, the user can designate a plurality of images to be printed. That is, the method of designating an image to be printed is not particularly limited.

In the print sequence of the print sequence execution unit 114, the host communication command generation unit 113 generates a print image data transfer request command (print image transfer request command) IDC_GET_PRINT_IMG. The transfer request command is transmitted to the communication unit 111, and the host information processing apparatus 102 then waits for image data transmitted from the image inputting apparatus.

Upon receiving the command IDC_GET_PRINT_IMG, the image inputting apparatus 101 interprets the transfer request command using the communication command interpretation unit 107, and launches the communication command execution unit 108. One or more images to be printed are selected from those stored in the image data memory 109, and image data corresponding to the selected images are transferred as print image data to the host information processing apparatus 102 via the communication unit 111.

Upon receiving the print image data, the print sequence execution unit 114 launches the print image forming unit 115, and makes it form a print image in a layout which is preferable to print the received print image data. As an example of the preferable layout, when two landscape images are received as image data to be printed, and these images are to be printed on an A4 recording sheet, an image that juxtaposes the two images vertically may be formed. However, the layout is not particularly limited. Furthermore, the print image forming unit 115 also executes image processes such as color correction, dithering, generation of a color pallet, and the like in accordance with different color reproduction characteristics between the image inputting apparatus 101 and printer apparatus 103.

Moreover, the print sequence execution unit 114 launches the printer driver 117 and passes the formed print image to the printer driver 117 and requests it to print an image corresponding to the print image. Upon receiving the print request, the printer driver 117 drives the printer apparatus 103 via the communication unit 118 to print the print image on the recording sheet 119.

<Image inputting apparatus>

Figure 2:
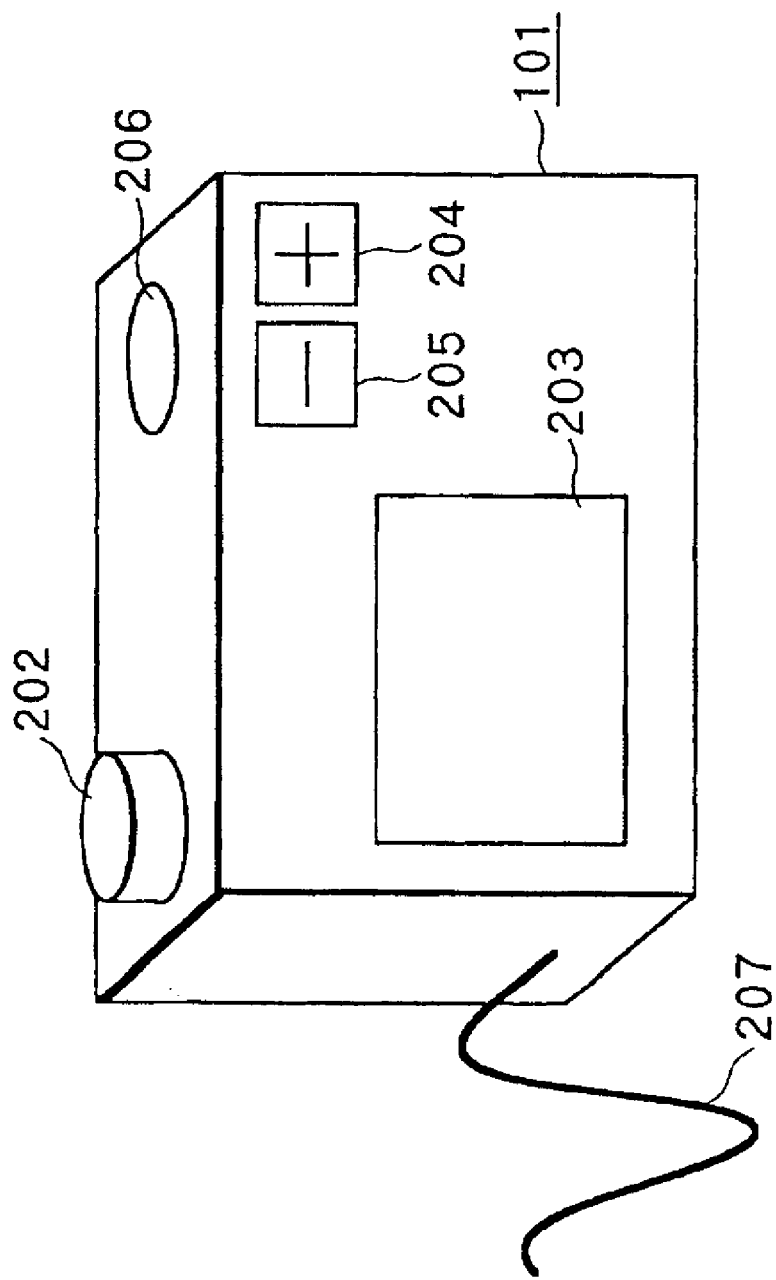
FIG. 2 is a perspective view showing the outer appearance of a digital still camera as the image inputting apparatus of the first embodiment.

FIG. 2 shows the outer appearance of a digital still camera as the image inputting apparatus 101 of the first embodiment.

Referring to FIG. 2, reference numeral 202 denotes a mode setting dial for setting the operation mode of the camera 101 in accordance with the dial position. The camera 101 of the first embodiment has an image sensing mode, playback mode, and print mode as the operation modes. Also, the camera 101 of the first embodiment uses as the image display unit 110 a LCD 203 which is prevalently used in digital still cameras. In the first embodiment, one of sensed images stored in the image data memory 109 is displayed on the LCD 203 in the print mode.

Reference numeral 204 denotes a "+" button; and 205, a "−" button, which are used by the user to select an image to be displayed on the LCD 203. When the user presses one of these buttons in the print mode, he or she can select the next or previous image of the image currently displayed on the LCD 203 from those stored in the image data memory 109 in the predetermined order.

Reference numeral 206 denotes a release button. When the user has pressed this button 206, he or she can input an image sensing instruction or print request to the camera 101. That is, in the print mode since the print request is input upon pressing the release button 206, the release button 206 serves as the print command user input unit 105. More specifically, upon pressing the release button 206, the communication command generation unit 106 generates a command IDC_PRINT_IMG that designates to print an image, and that command is transmitted to the host information processing apparatus 102 via the communication unit 111.

Reference numeral 207 denotes a communication cable which serves as a communication medium that connects the communication unit 111 and information processing apparatus 102. For example, the communication unit 111 or the like in the first embodiment uses a USB (Universal Serial Bus) controller, and the communication cable 207 uses a USB cable. Of course, a serial bus that matches or complies with IEEE1394 may be used in place of USB.

<Host Information Processing Apparatus>

Figure 3:
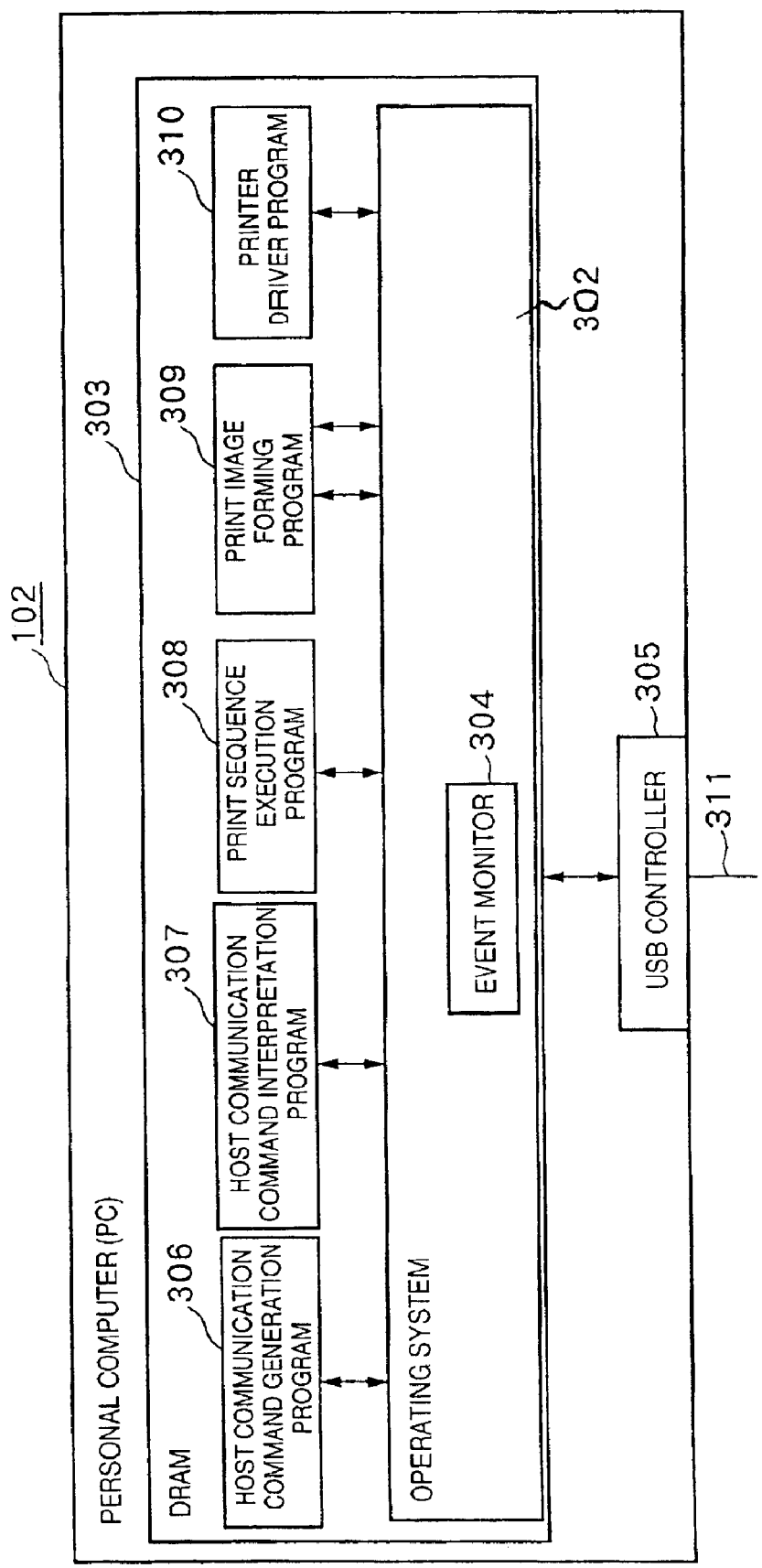
FIG. 3 is a block diagram showing the arrangement of a host information processing apparatus in the first embodiment.

FIG. 3 is a block diagram showing the arrangement of the host information processing apparatus 102 in the first embodiment.

The host information processing apparatus 102 is a generally prevalent personal computer (PC), and can execute various programs on an operating system (OS) 302 such as Microsoft Windows98® or the like. Therefore, software programs corresponding to the function units shown in FIG. 1 are loaded onto a DRAM 303, as shown in FIG. 3, and a CPU (not shown) executes such programs to implement those function units. The PC 102 is connected with peripheral devices such as a keyboard, display, mouse, and the like, and comprises a storage unit such as a hard disk, although they are not shown in FIG. 3.

An architecture called "push model" of Window98® operating system used in the first embodiment will be briefly explained.

Window98® adopts an architecture called "push model". In a push model, when a USB cable is connected to a USB (or external connection) terminal equipped on the PC 102, and a push model device is connected to the other terminal of the USB cable, connection of the push model device is detected to launch a program (corresponding program) which is associated with each device. Also, when a push model device is connected upon starting up the OS, the corresponding program is automatically launched. Furthermore, an event monitor (Still Image Event Monitor) 304 monitors a command (event) transmitted from each device, and transmits an event to a control center (Still Image Control Center) upon generation of the event. A program corresponding to the command (event) can acquire the command (event) via the control center. Note that "event" is a kind of "command", and a command issued in correspondence with the input made by the user at the image inputting apparatus 101 will be especially referred to as an "event" in the following description.

In the first embodiment, to adopt the push model architecture, assume that the image input device 101 comprises a function as a push model device. Note that the push model of Window98® has been exemplified, but the present invention is not limited to such specific architecture, as long as the host communication command interpretation unit 113 is running in the host information processing apparatus 102 to acquire and interpret a command received by the communication unit 118 when the user inputs a print request command. Therefore, a daemon program that monitors data received by the communication unit 118 may reside and the print sequence may be executed in response to the recognized print request command as a trigger, thus implementing a unique structure.

Referring to FIG. 3, reference numeral 305 denotes a USB controller as an example of the communication unit 118. Reference numeral 306 denotes a host communication command generation program as an example of the host communication command generation unit 113. Reference numeral 308 denotes a print sequence execution program as an example of the print sequence execution unit 114. Reference numeral 309 denotes a print image forming program as an example of the print image forming unit 115. Reference numeral 310 denotes a printer driver program as an example of the printer driver 117. Reference numeral 311 denotes a USB cable which is used to connect an external apparatus such as the digital still camera 101, printer 103, and the like.

<Printer Apparatus>

In general, printers are put on the market attached with printer driver programs. Normally, printer driver programs are prepared and distributed in units of printer types, communication means types, and operating systems. The printer driver 117 of the first embodiment can be such general one, and the printer driver program in the first embodiment is the one for USB and Windows98® for the printer apparatus 103. Also, the printer driver program 310 in the first embodiment transfers image data to the printer apparatus 103 via the USB controller 305, and issues a print request. Furthermore, the program 310 executes processes such as color correction, image format conversion, packetization of data to be transmitted, negotiation in data transfer with the printer apparatus 103, and the like, as needed. These functions are also equivalent to those of a printer driver program attached to a commercially available printer.

<Print Process>

Figure 4:
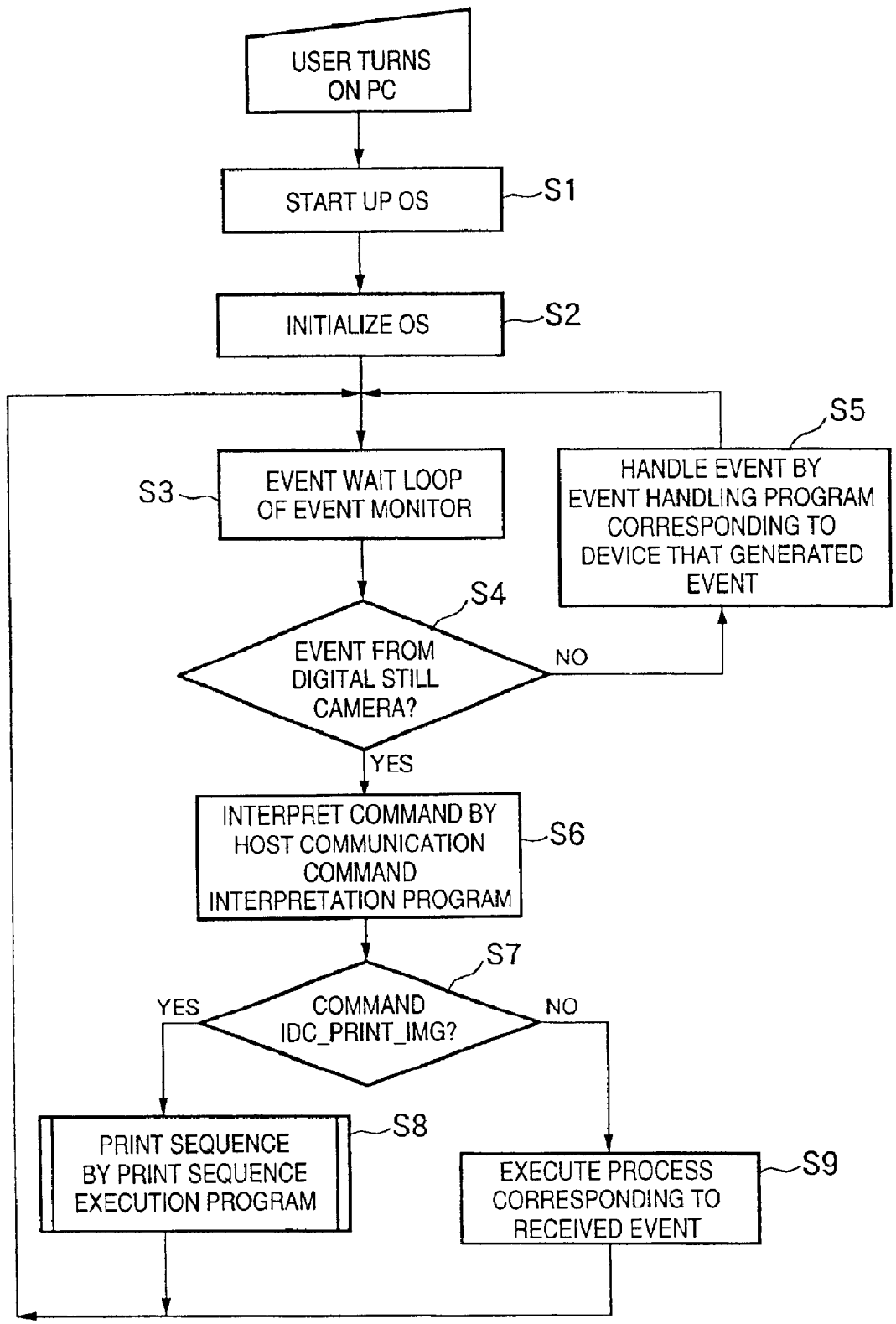
FIG. 4 is a flow chart showing the sequence of a print process in the information processing apparatus in the first embodiment.

FIG. 4 is a flow chart showing the sequence of the print process in the PC 102. When the user turns on the power switch of the PC 102 while the camera 101 and PC 102 are connected via the USB cable, the PC 102 starts the process shown in FIG. 4.

The OS 302 is started up in step S1, and is initialized in step S2. At this time, the OS 302 detects that the camera 101 is connected via the USB cable 311, and launches the host communication command generation program 306 and host communication command interpretation program 307.

In step S3, the event monitor 304 polls events received via the USB cable 311, and is set in an event wait state. Upon detecting some event by the event monitor 304, the flow advances to step S4.

It is checked in step S4 if the received event is the one from the camera 101. If the event is received from a device other than the camera 101, the flow advances to step S5. On the other hand, if the event is received from the camera 101, the flow advances to step S6. In step S5, an event handling program corresponding to the event that generated the event executes a process corresponding to the received event, and the flow then returns to step S3.

The host communication command interpretation program 307 interprets the contents of the event in step S6, and the control branches in step S7 to processes corresponding to the contents of the received event. If the received event is IDC_PRINT_IMG (an event issued by the camera 101 when the user inputs a print request at the print command user input unit 105), the print sequence execution program 308 executes a print sequence in step S8, and the flow returns to step S3. On the other hand, if the received event is an event other than IDC_PRINT_IMG, a process corresponding to that event is executed in step S9, and the flow returns to step S3. Details of the print sequence by the print sequence execution program 308 in step S8 will be described later.

<Print Request Event Issuance Procedure>

Figure 5:
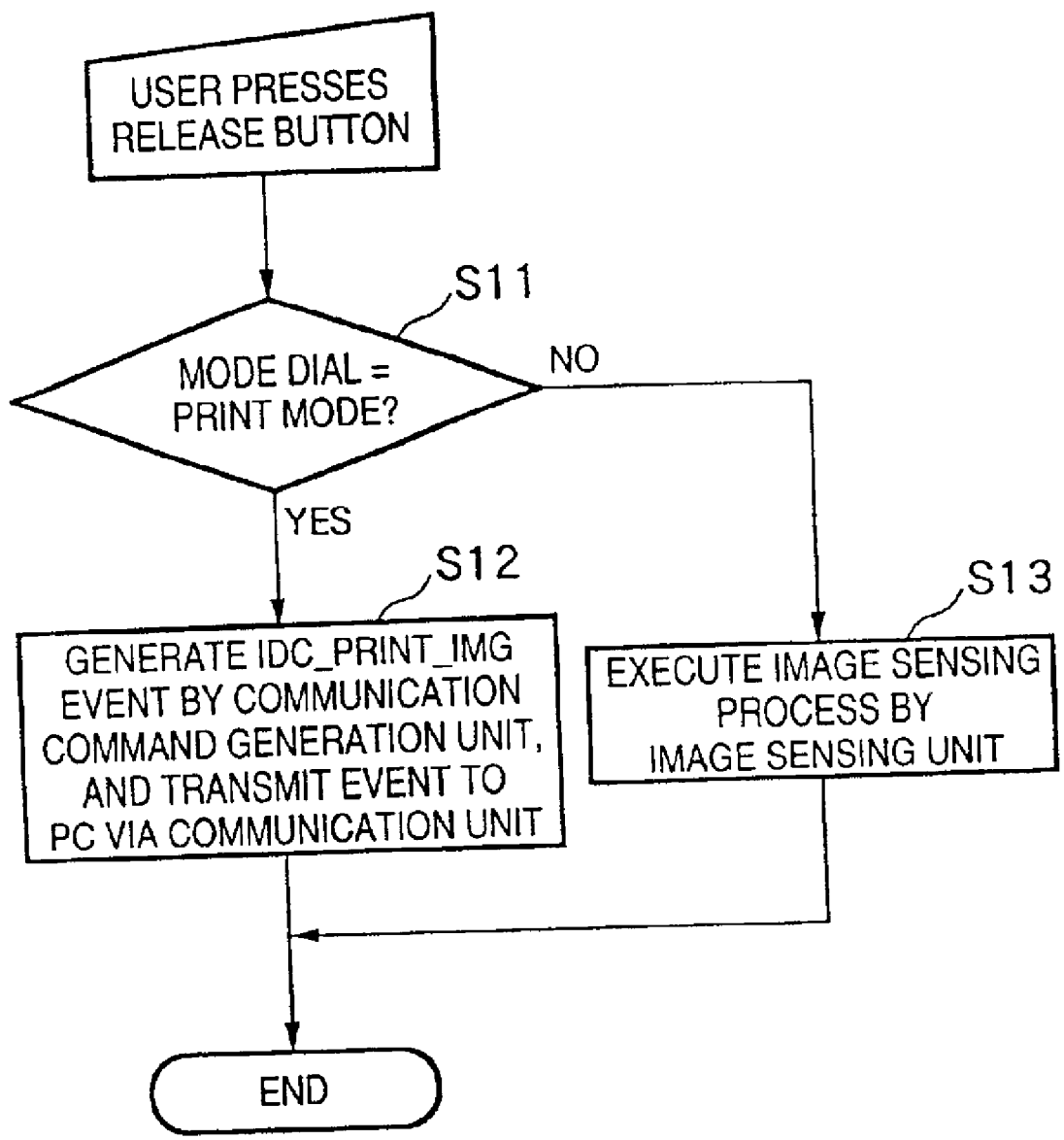
FIG. 5 is a flow chart showing the sequence of a print request event issuance procedure by the image inputting apparatus of the first embodiment.

FIG. 5 is a flow chart showing the print request event issuance procedure by the camera 101. The process starts when the user has pressed the release button 206.

It is checked in step S11 if the currently set mode is the print mode, i.e., the mode setting dial 202 is set at the "print" position. If the current mode is not the print mode but the image sensing mode, the image sensing process is done in step S13. Of course, if another mode is selected, a process corresponding to that mode is done. If the currently set mode is the print mode, the communication command generation unit 106 generates IDC_PRINT_IMG as a command (event) indicating a print request and that event is transmitted to the PC 102 via the communication unit 111 in step S12, thus ending the print event issuance process.

<Print Sequence>

Figure 6:
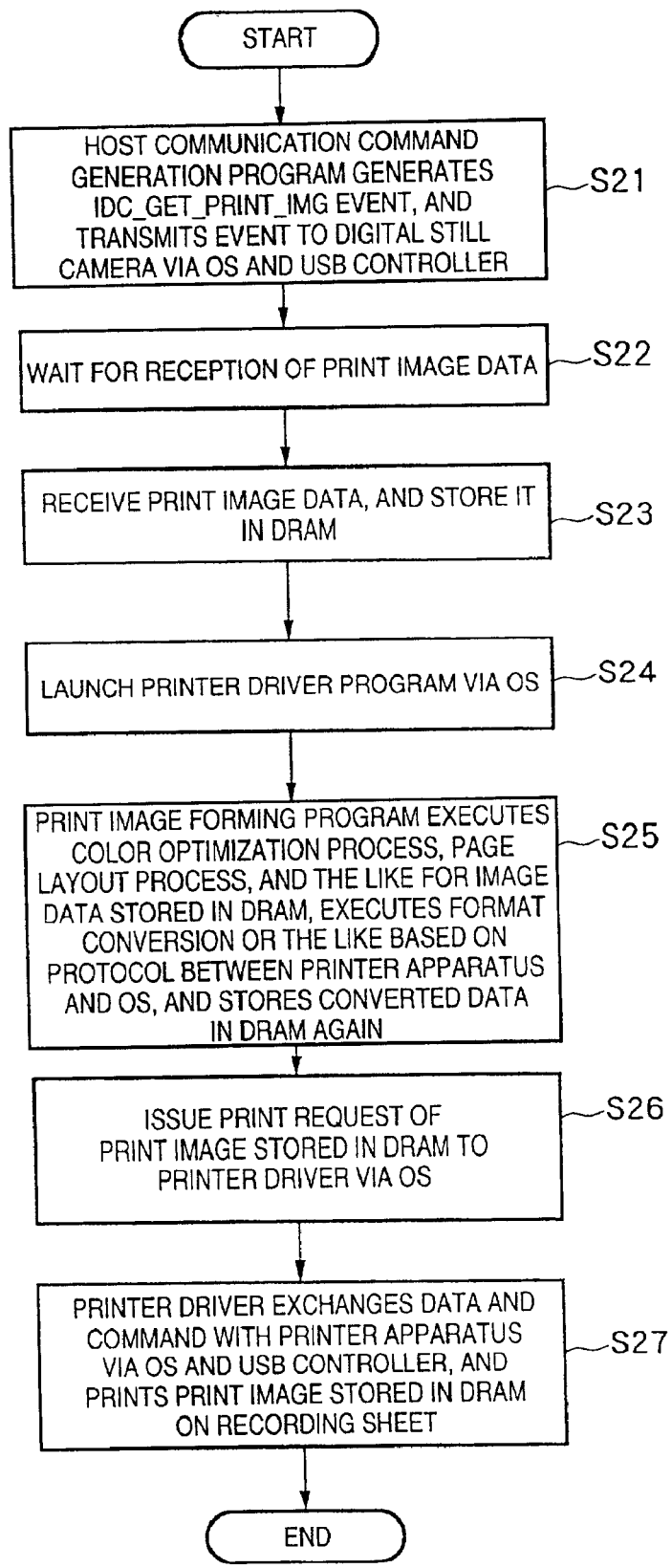
FIG. 6 is a flow chart showing the print sequence by a print sequence execution program in the first embodiment.

FIG. 6 is a flow chart showing the print sequence by the print sequence execution program 308.

In the print sequence, a transfer request of image data to be printed is issued to the camera 101 in step S21. More specifically, the host communication command generation program 306 generates a command IDC_GET_PRINT_IMG that requests transfer of image data to be printed, and transmits it to the camera 101 via the OS 302, USB controller 305, and the like. After that, the control waits for print image data received from the camera 101 in step S22. During this interval, the camera 101 executes a print image transmission process shown in FIG. 7, and starts image data transfer to the PC 102. Details of this process will be explained later.

When the camera 101 has started image data transfer, the received print image data is stored in turn in the DRAM 303 in step S23. Upon completion of transfer of print image data, the flow advances to step S24, and the printer driver program 310 corresponding to the currently connected printer apparatus 103 is launched via the OS 302.

In step S25, the print image forming program 309 converts the format of the print image data stored in the DRAM 303 into a print image as the image data format that the printer driver program 310 can process, and stores the converted data in DRAM 303. At this time, an image correction process is executed in consideration of the resolution and print characteristics such as color, density, and the like of the printer 103, and the resolution and image characteristics such as color, density, and the like of the camera 101, and a print image is formed in consideration of the layout and sizes of images to be printed.

The Windows Operating System has a concept called a graphic device interface (GDI). A client program that requests printout acquires the function of the printer apparatus 103 via a GDI function, and draws a print image on a device context in accordance with the acquired function. The first embodiment handles the image data drawn on the device context as a print image.

Upon completion of function of the print image via the OS 302, a print request of the print image stored in the DRAM 303 is issued to the printer driver program 310 via the OS 302. Upon receiving the print request, the printer driver program 310 exchanges commands with the printer apparatus 103 via the OS 302 and USB controller 305 to drive the printer apparatus 103 to print the print image on the recording sheet by transmitting the print image in step S27. Upon completion of the print process, the print sequence ends.

<Transmission of Print Image Data>

Figure 7:
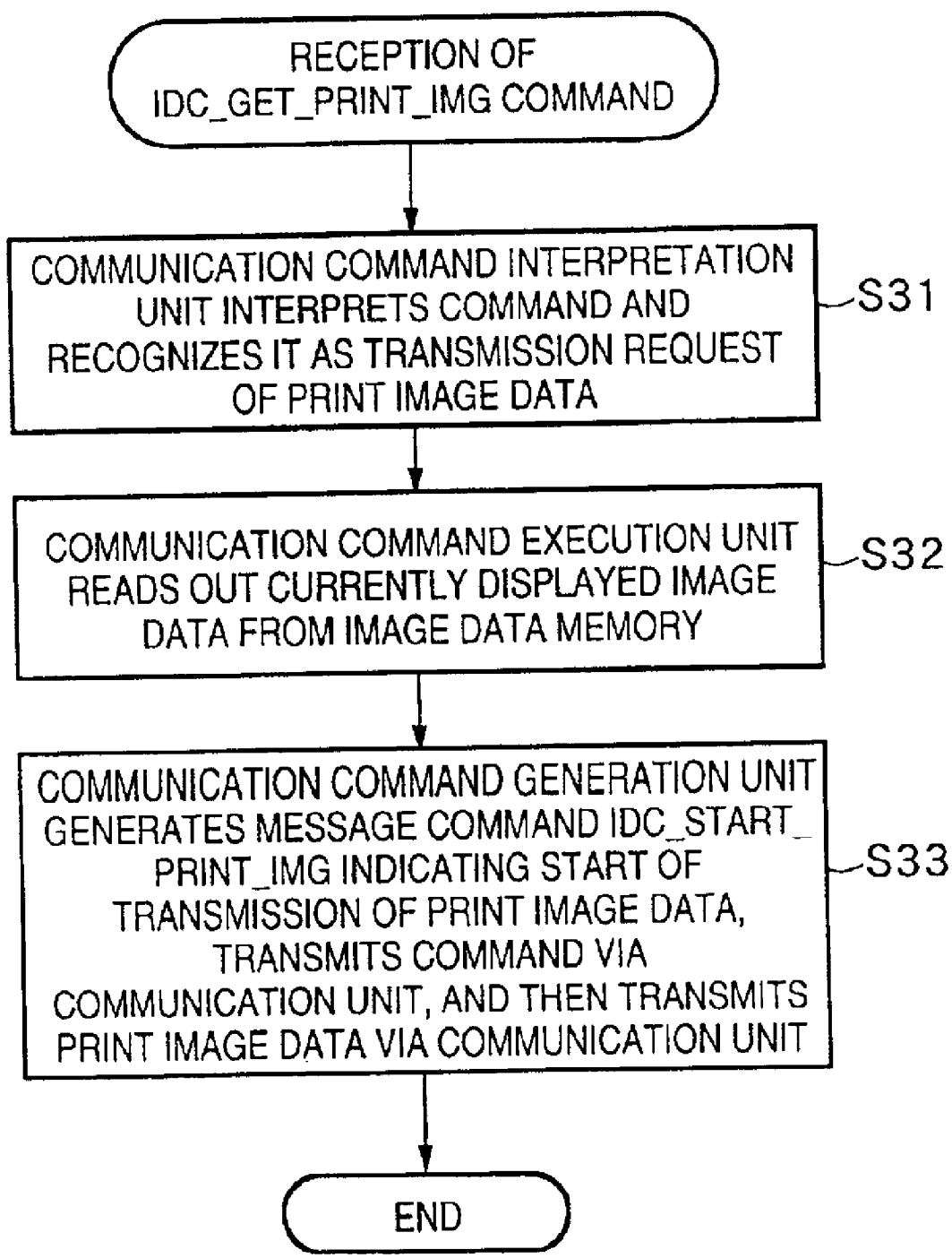
FIG. 7 is a flow chart showing the print image data transmission sequence by the image inputting apparatus of the first embodiment.

FIG. 7 is a flow chart showing the print image data transmission sequence by the camera 101.

When the camera 101 has received IDC_GET_PRINT_IMG from the PC 102, the communication command interpretation unit 107 interprets the command, and determines that the received command is a print image transmission request (step S31). In step S32, the communication command execution unit 108 reads out image data corresponding to the image currently displayed on the LCD 203 as print image data from the image data memory 109. In step S33, the communication command generation unit 106 generates a message command IDC_START_PRINT_IMG indicating the start of transmission of print image data, transmits it via the communication unit 111, and also transmits print image data via the communication unit 111 after that command. Upon completion of transmission of the print image data, this process ends.

As described above, the print system of the first embodiment has an inexpensive arrangement that uses a commercially available printer. With this system, when the user prints an image sensed by the image inputting apparatus, he or she can easily print the sensed image with high quality and appropriate layout without any complicated operation on the computer, i.e., by only connecting the camera 101 and PC 102.

[Second Embodiment]
<Arrangement>

Figure 8:
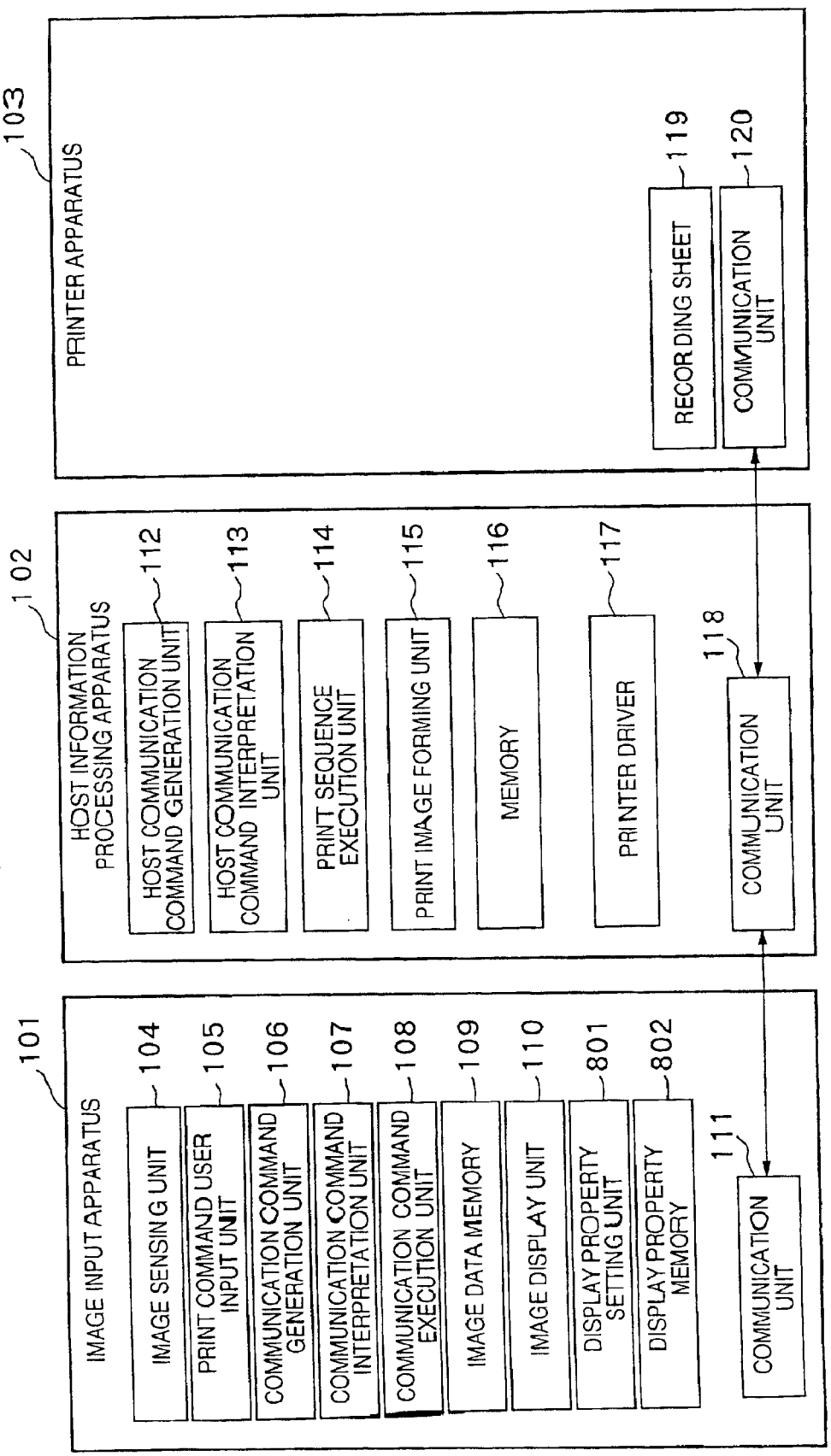
FIG. 8 is a block diagram showing the basic arrangement of an image inputting apparatus and print system according to the second embodiment of the present invention.

FIG. 8 is a block diagram showing the basic arrangement of the image inputting apparatus 101 and print system according to the second embodiment. The image inputting apparatus 101 of the second embodiment comprises a display property setting unit 801 and display property memory 802 in addition to the arrangement of the first embodiment.

The display property setting unit 801 sets a display property upon playing back and displaying a sensed image on the image display unit 110 when the user has operated some buttons, dials, and the like of the image inputting apparatus 101. The contents of the display property include the lightness, gains of respective color components, contrast, color temperature, gamma value, and the like. Most of TV monitors, computer displays, digital cam recorders with display devices have a setting unit for setting the display property such as the lightness, gains of respective color components, contrast, color temperature, gamma value, and the like upon displaying an image. The display property setting unit 801 in the second embodiment may be the same as such setting unit.

The display property memory 802 stores display property values set by the user using the display property setting unit 801. The image inputting apparatus 101 in the second embodiment transmits the display property stored in the display property memory 802 to the host information processing apparatus 102 together with print image data. The host information processing apparatus 102 executes image processes for printing image data in accordance with the received display property, and then makes the printer apparatus 103 print the image. In this manner, the user can obtain a print image having the brightness, contrast, and color tone of his or her choice by adjusting the brightness, contrast, and color tone of a playback image displayed on the image display unit 110 of the image inputting apparatus 101 without operating the host information processing apparatus 102.

Figure 9:
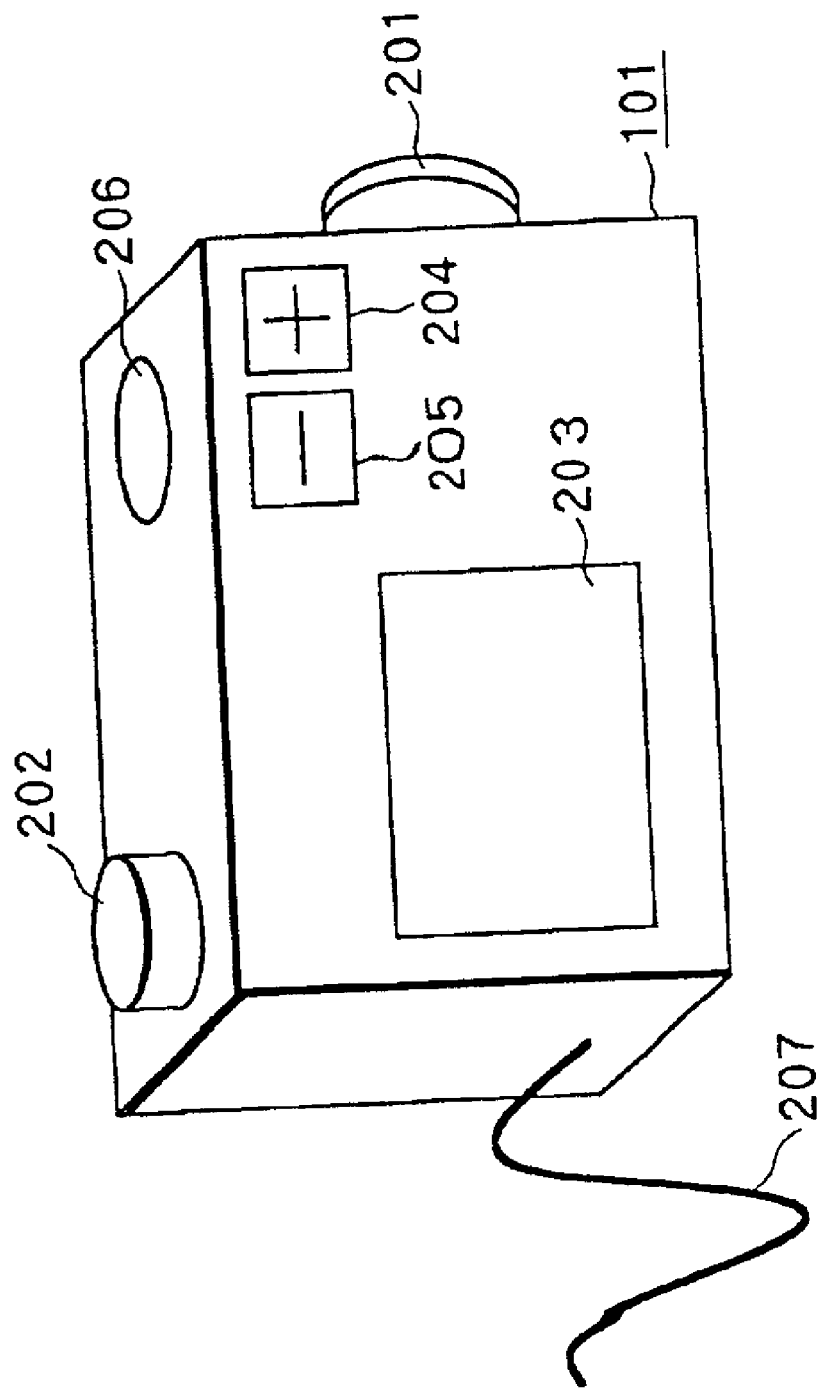
FIG. 9 is a perspective view showing the image inputting apparatus in the second embodiment.

FIG. 9 shows an example of the outer appearance of the image inputting apparatus (digital still camera) 101 of the second embodiment. A lightness setting dial 201 is added to the camera 101 of the first embodiment. The lightness setting dial 201 is an example of the display property setting unit 801. By turning the lightness setting dial 201, the user can make the image displayed on the LCD 203 brighter or darker. In this manner, in the second embodiment the lightness can be set as the display property.

The host information processing apparatus 102 of the second embodiment has the same arrangement as that of the first embodiment, but the print sequence by the print sequence execution program 308 and the print image forming process by the print image forming program 309 are different from those in the first embodiment.

<Transmission of Print Image Data and Display Lightness Value>

Figure 10:
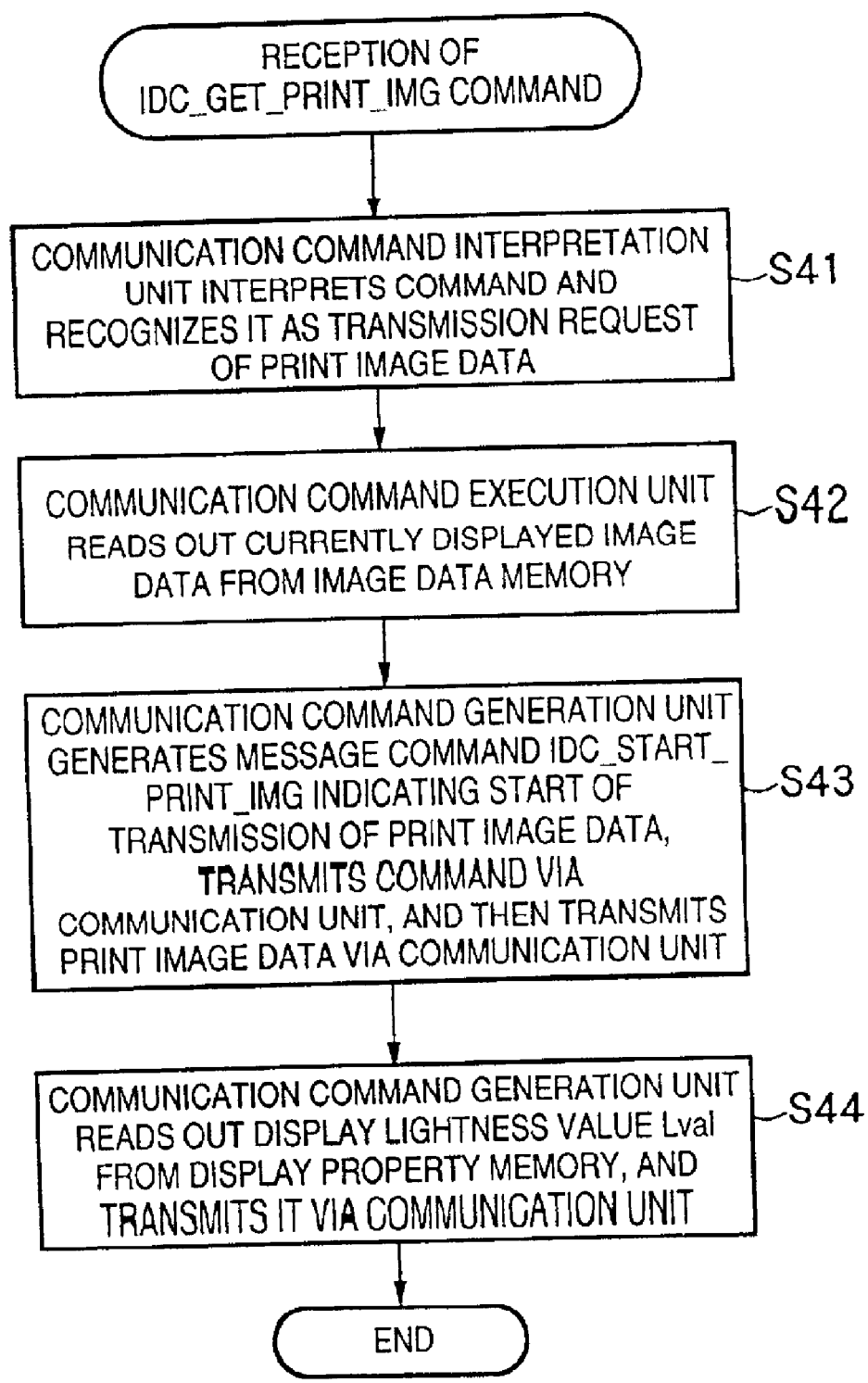
FIG. 10 is a flow chart showing the transmission sequence of print image data and a display lightness value of the image inputting apparatus of the second embodiment.

FIG. 10 is a flow chart showing the transmission sequence of print image data and a display lightness value by the camera 101 of the second embodiment. Note that the second embodiment sets and transmits the lightness value alone as the display property. However, the present invention is not limited to such specific value, and the gains of respective color components, contrast, color temperature, gamma value, and the like can be similarly set and transmitted as other display property values. That is, the contents of the image process to be done in units of property values are the same as those corresponding to each property executed by photoretouch software for a personal computer.

In FIG. 10, the processes from steps S41 to S43 are the same as those in the print image data transmission procedure (steps S31 to S33) by the camera 101 in the first embodiment shown in FIG. 7. After that, the communication command generation unit 106 reads out a display lightness value Lval as a display property from the display property memory 802, and transmits it via the communication unit 111, thus ending the process.

In the second embodiment, a value ranging from −50 to +50 can be set as the display lightness value by turning the lightness setting dial 201, and a playback image is displayed on the image display unit 110 to have −50 as 50% default display lightness, and +50 as 150% default display lightness.

<Print Sequence>

The print process of the PC 102 in the second embodiment is substantially the same as that in the first embodiment shown in FIG. 4, but the print sequence executed by the print sequence execution program 308 in step S8 is different from that in the first embodiment.

Figure 11:
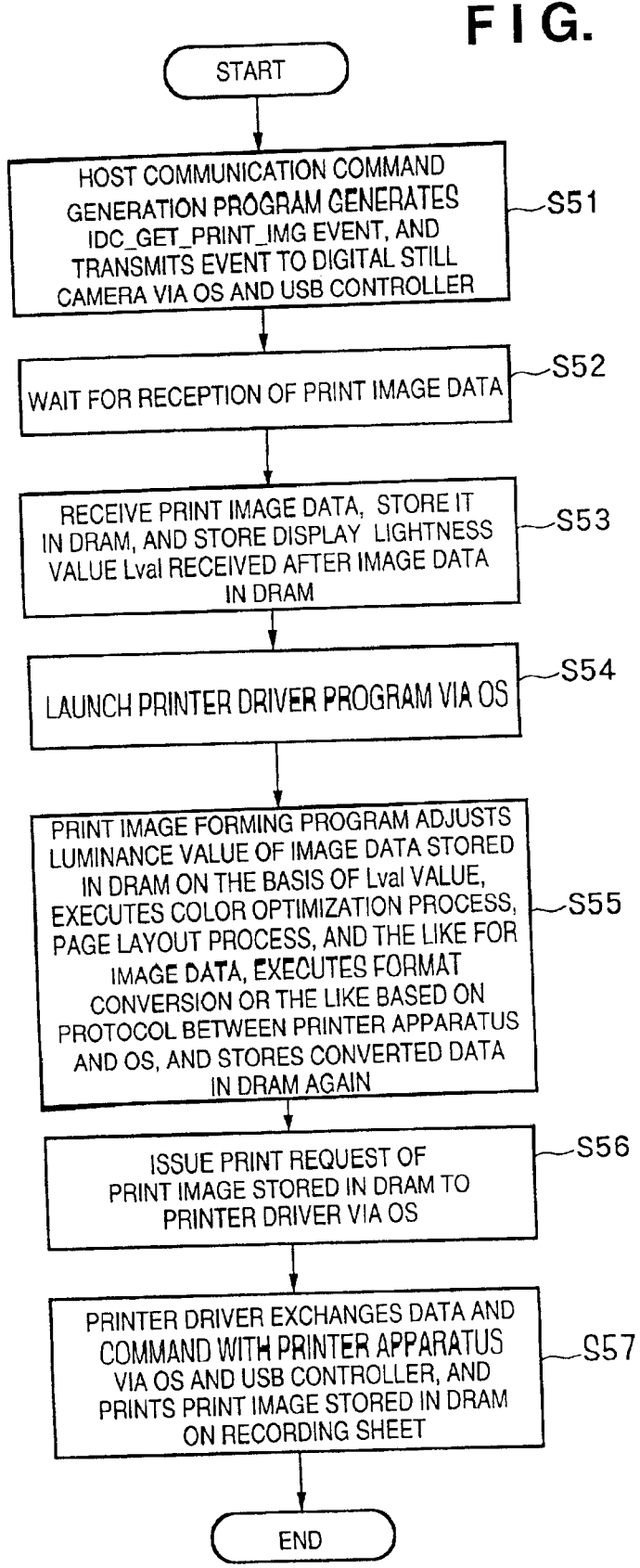
FIG. 11 is a flow chart showing the print sequence in the second embodiment.

FIG. 11 is a flow chart showing the print sequence in the second embodiment.

In FIG. 11, since steps S51, S52, S54, S56, and S57 are the same as those (steps S21, S22, S24, S26, and S27) in the print sequence of the first embodiment shown in FIG. 6, the processes in steps S53 and S55 will be explained below.

In step S53, print image data is received and is stored in the DRAM 303. Also, the display lightness value Lval received after the print image data is received is stored in the DRAM 303. In step S55, the print image forming program 309 executes luminance value conversion of image data stored in the DRAM 303 on the basis of the display lightness value Lval stored in the DRAM 303.

Assuming that the print image data is expressed by a YCrCb color space, if Lval=−20, the print image forming program 309 multiplies Y data of all pixels of the print image data by 80/100, and stores the products as the luminance value conversion result in the DRAM 303. After that, the program 309 executes an optimization process, page layout process, and the like for Cr and Cb data as color components, executes format conversion based on the protocol between the printer apparatus 103 and OS 302, and stores the print image data in the DRAM 303.

In this manner, according to the second embodiment, the same effect as in the first embodiment can be obtained, and the user can set an image process to be executed by the host information processing apparatus 102 by operating the interface of the image inputting apparatus 101. Therefore, the user can easily obtain a print image having the brightness, contrast, and color tone of his or her choice by adjusting those of a playback image displayed on the image display unit 110 of the image inputting apparatus 101.

[Third Embodiment]

<Arrangement>

Figure 12:
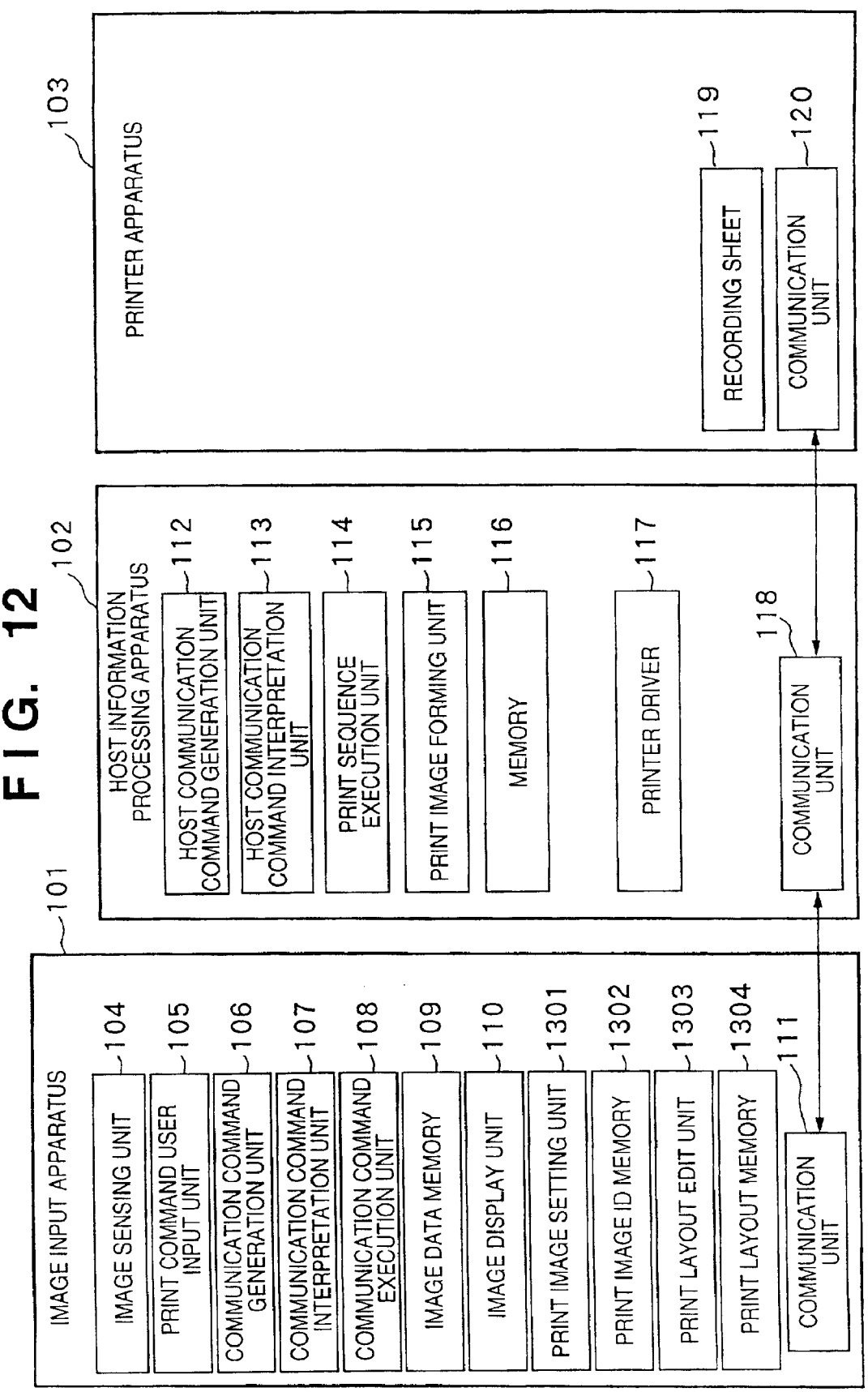
FIG. 12 is a block diagram showing the basic arrangement of an image inputting apparatus and print system according to the third embodiment of the present invention.

FIG. 12 is a block diagram showing the basic arrangement of the image inputting apparatus 101 and print system according to the third embodiment. The image inputting apparatus 101 of the third embodiment comprises, in addition to the arrangement of the first embodiment, a print image setting unit 1301 for setting one or more images (to be simply referred to as "print images" hereinafter) the user wants to print from sensed images stored in the image data memory 109, a print image ID memory 1302 for storing ID information of each print image set by the print image setting unit 1301, a print layout edit unit 1303 with which the user inputs and edits a layout upon printing each print image stored in the print image ID memory 1302, and a print layout memory 1304 for storing print layout information which is input and edited by the user using the print layout edit unit 1303.

The image inputting apparatus 101 transmits print image data to the host information processing apparatus 102, and also transmits print layout information stored in the print layout memory 1304 to request the host information processing apparatus 102 to print in accordance with the print layout information. Upon receiving this request, the host information processing apparatus 102 forms a print image in accordance with the print layout information in the print image forming process of the print image forming unit 115.

The host information processing apparatus 102 of the third embodiment has the same arrangement as that of the first embodiment, but the print sequence by the print sequence execution program 308, and the print image forming process by the print image forming program 309 are different from those in the first embodiment.

Figure 13:
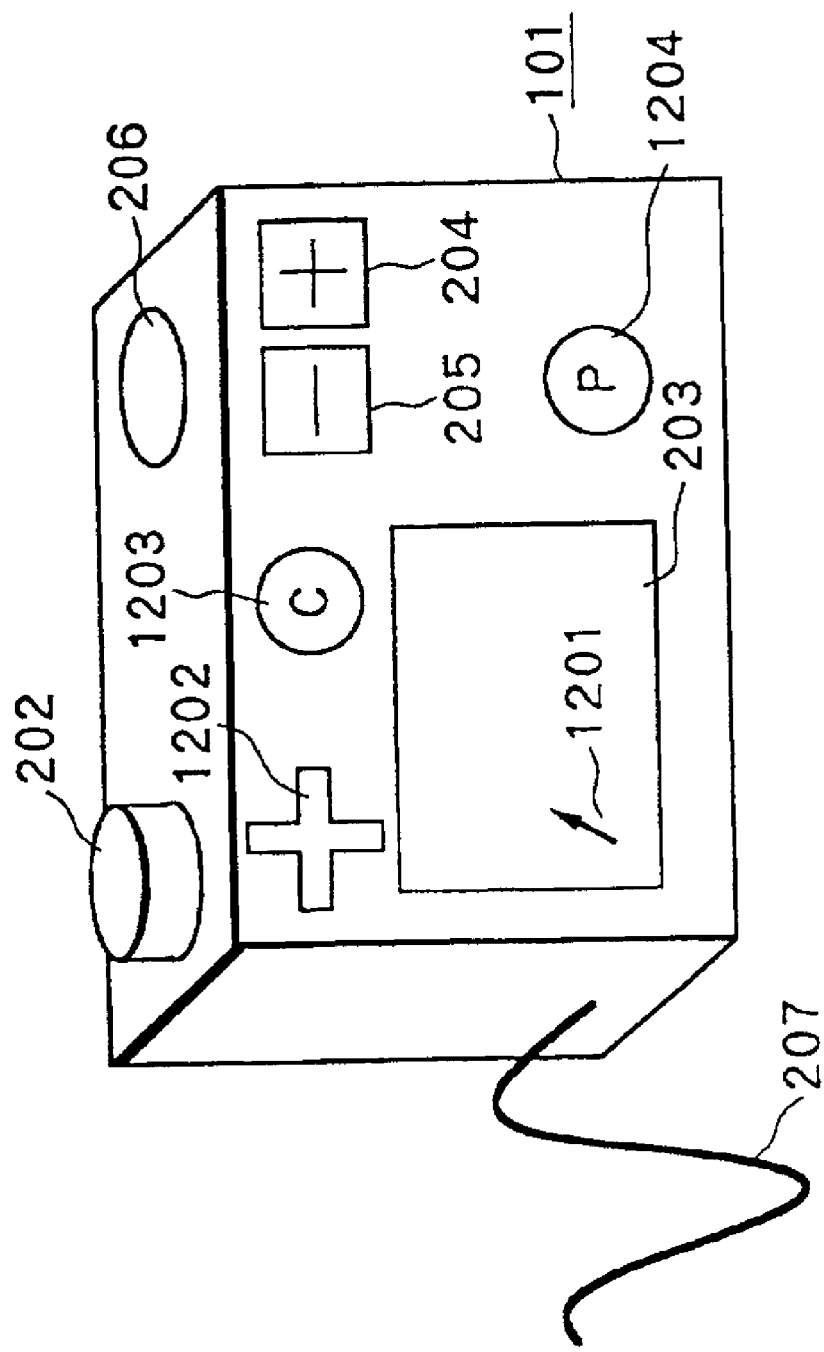
FIG. 13 is a perspective view showing the outer appearance of the image inputting apparatus in the third embodiment.

FIG. 13 shows the outer appearance of the camera 101 in the third embodiment.

Referring to FIG. 13, reference numeral 1201 denotes a pointing cursor with which the user points to a position upon editing a print layout. Reference numeral 1202 denotes a cross-cursor key with which the user indicates the up, down, right, or left direction. With this indication, the pointing cursor 1201 moves upward, downward, leftward, or rightward on the LCD 203. Reference numeral 1203 denotes an input button. Upon pressing this input button 1203, the user can input the current position of the pointing cursor 1201 to the image inputting apparatus 101 as a command. That is, the input button 1203 has the same function as a button equipped on a mouse. Reference numeral 1204 denotes a print mark button. Upon pressing the print mark button 1204, the user can toggle the currently displayed image as a print image or non-print image. That is, an image which is not set as the print image is set as the print image, and the setup of an image which is already set as the print image is canceled.

When a print image is displayed on the LCD 203 in the print mode, letter "p" (to be referred to as a "print mark" hereinafter) is displayed on the upper left corner of the LCD 203.

Assume that 100 images are stored in the image data memory 109, and five images 1 to 5 of those are set as print images. FIG. 14 shows the memory map in the print image ID memory 1302 in this case. As shown in FIG. 14, the IDs of images to be printed, i.e., image 1 to image 5 are stored together with indices.

<Layout Edit>

Figure 15:
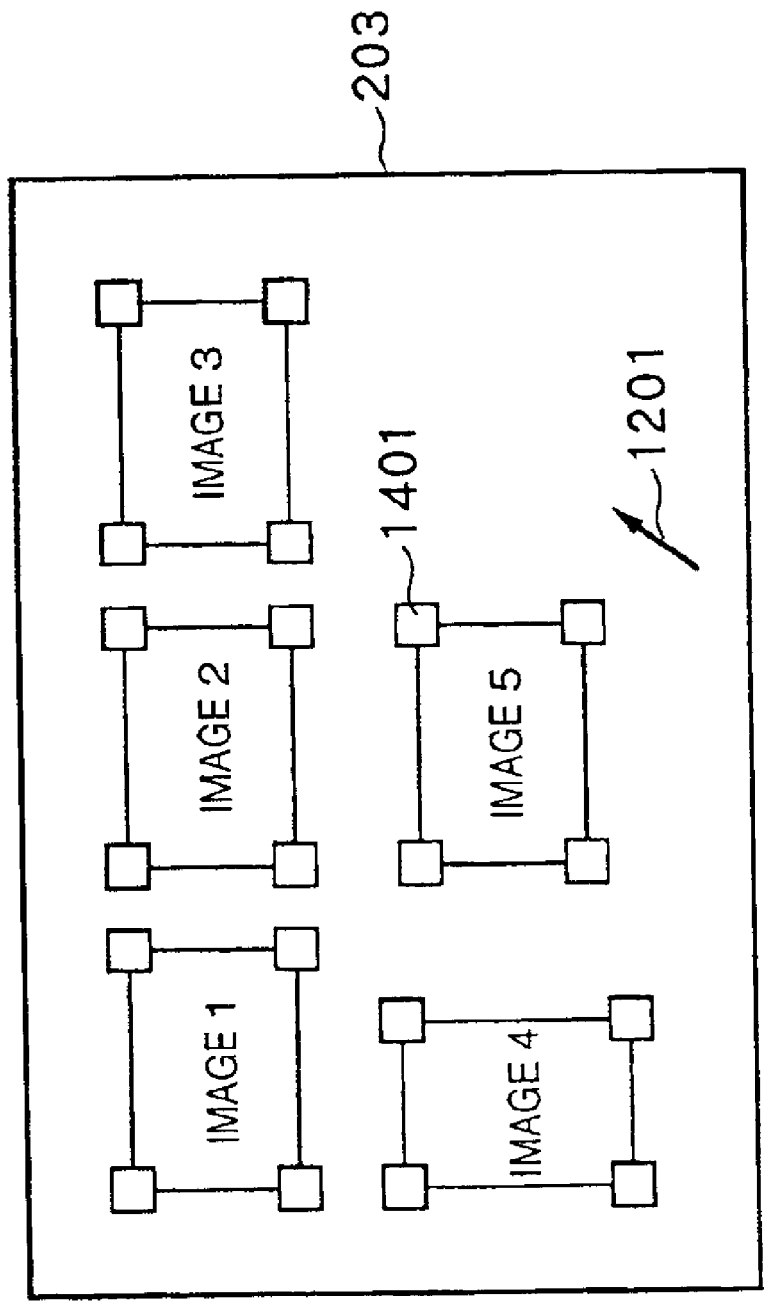
FIG. 15 shows a display example of an LCD.

When the user has pressed the release button 206 in the print mode and in the state of print image ID memory 1302 in FIG. 14, the camera 101 displays display images corresponding to image 1 to image 5 on the LCD 203. FIG. 15 shows a display example of the LCD 203 at that time. The way the user edits the print layout with respect to the print layout edit unit 1303 will be described in detail below using FIG. 15.

Referring to FIG. 15, the entire area of the LCD 203 represents a printable area per recording sheet, and images 1 to 5 are printed on the recording sheet 119 in the layout shown in FIG. 15. Handles 1401 are displayed at the four corners of each display image on the LCD 203. When the cursor 1201 is moved to the position of each handle 1401 by operating the cross-cursor key 1202, and is further moved while holding down the input button 1203, the position of that handle 1401 can be moved. The display image, the handle 1401 of which has been moved, is enlarged or reduced to fit in a rectangle having the moved handle 1401 and that at a diagonal position as two vertices. When the cursor 1201 is moved onto a desired display image using the cross-cursor key 1202, and the display image is moved together with the cursor 1201 while holding down the input button 1203, the display position of that display image can be moved.

Figure 16:
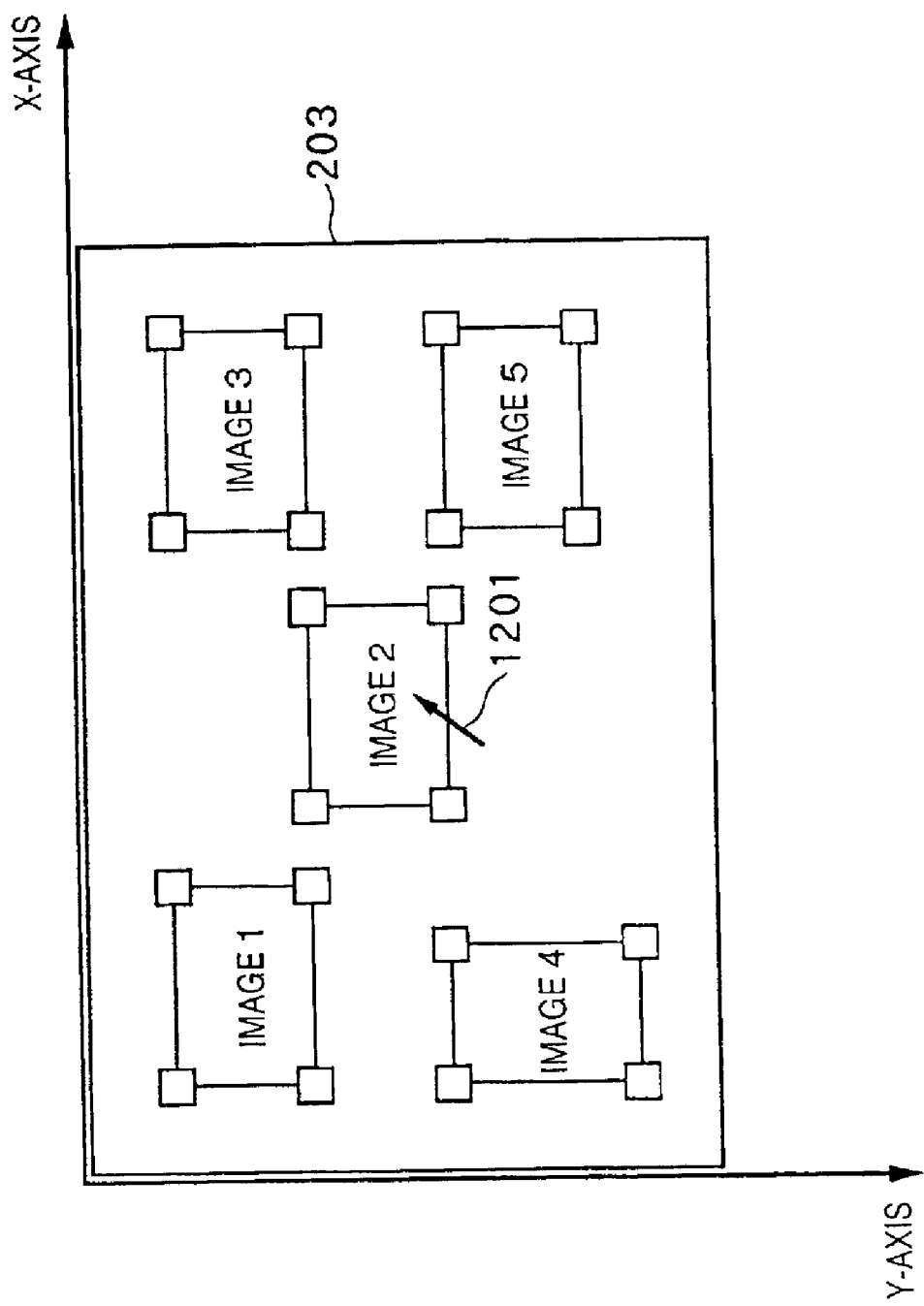
FIG. 16 shows a display example of the LCD after the user has edited a layout.

The print layout that has been edited by the print layout edit unit 1303 is stored in the print layout memory 1304. FIG. 16 shows a display example on the LCD 203 after the user has edited the layout.

FIG. 17 shows the memory map in the print layout memory 1304. As shown in FIG. 17, the position information of each image with an index number stored in the print image ID memory 1302 as a print image is stored as the X- and Y-coordinate values of the upper left and lower right corners. In the third embodiment, X- and Y-axes are set, as shown in FIG. 16, and the position on the recording sheet 119 is expressed in millimeters. The memory map example shown in FIG. 17 shows the storage contents of the print layout memory 1304 when the user has edited the layout shown in FIG. 16.

When the user has pressed the release button 206 in the states shown in FIGS. 14 and 17, the camera 101 issues a print event IDC_PRINT_IMG as in FIG. 5 in the first embodiment. Also, as in the first embodiment, the print 102 receives IDC_PRINT_IMG, and then issues a command IDC_GET_PRINT_IMG that requests transmission of print image data. Upon receiving IDC_GET_PRINT_IMG, the camera 101 transmits print image data and print layout information to the PC 102 in the processing sequence shown in FIG. 18.

<Transmission of Print Image Data and Print Layout Information>

Figure 18:
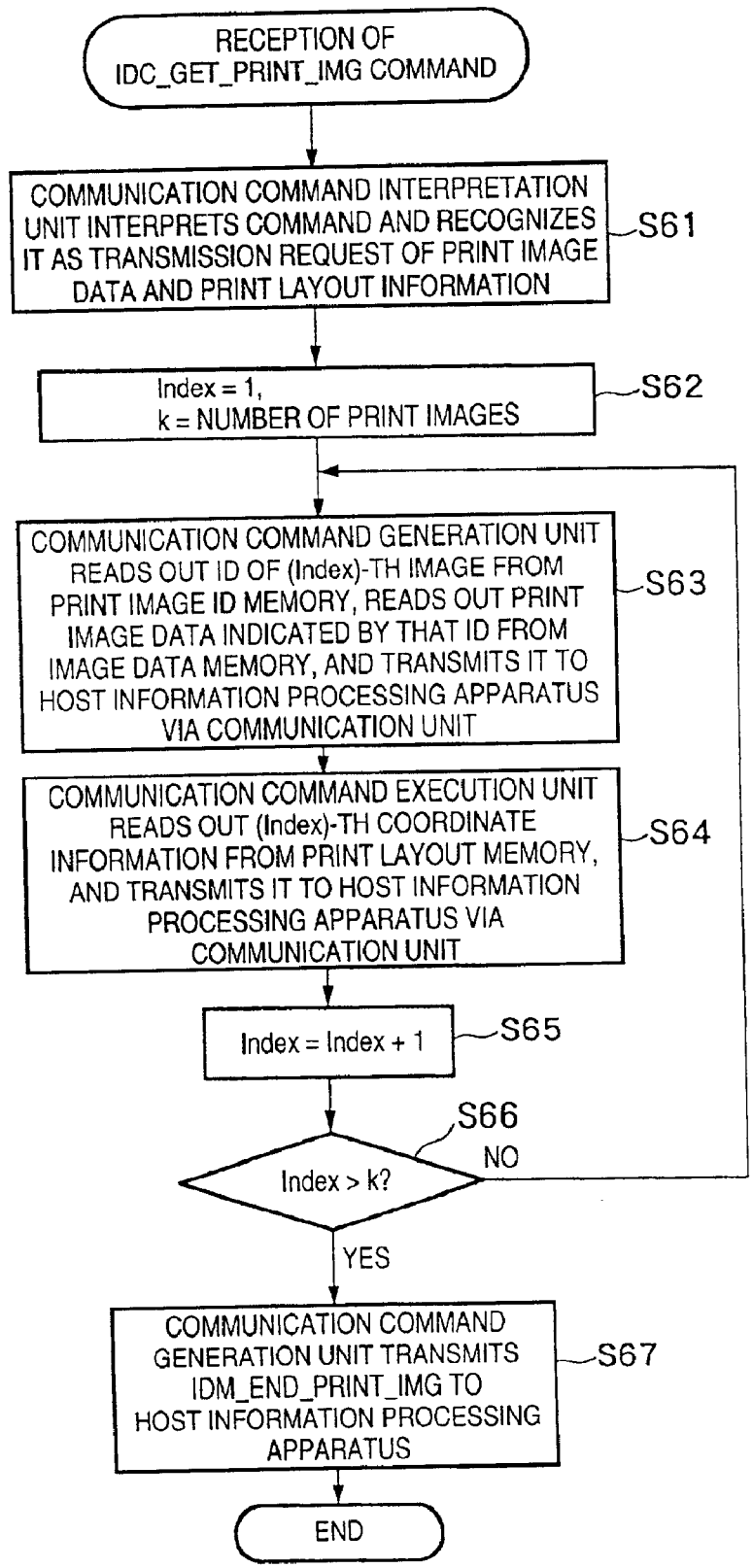
FIG. 18 is a flow chart showing the transmission sequence of print image data and print layout information by the image inputting apparatus of the third embodiment.

FIG. 18 is a flow chart showing the transmission sequence of print image data and print layout information by the camera 101.

When the camera 101 receives IDC_GET_PRINT_IMG from the host information processing apparatus 102, the communication command interpretation unit 107 interprets that command to recognize that the received command is a transmission request of print image data and print layout information in step S61. In step S62, variables are initialized (e.g., variables Index=1 and k=the number of print images). When the number of print images is "5", as shown in FIG. 14, variable k is initialized to "5".

In step S63, the communication command generation unit 106 acquires the ID of an image indicated by variable Index with reference to the print image ID memory 1302. The unit 106 reads out image data corresponding to the acquired ID from the image data memory 109, and transmits it as print image data to the host information processing apparatus 102 via the communication unit 111.

In step S64, the communication command execution unit 108 acquires the layout information (coordinate information) corresponding to variable Index in the order of the upper left X- and Y-coordinates and lower right X- and Y-coordinates with reference to the print layout memory 1304, and transmits such coordinate information to the host information processing apparatus 102 via the communication unit 111.

Subsequently, variable Index is incremented in step S65, and variable Index is compared with variable k in step S66. If Index≦k, since images to be transmitted still remain, the flow returns to step S63. If Index>k, since all images and layout information are transmitted, the communication command generation unit 106 transmits a message command IDM_END_PRINT_IMG indicating the end of transmission of print image data and layout information to the host information processing apparatus 102 via the communication unit 111. After that, the transmission process of print image data and print layout information ends.

<Print Sequence>

Figure 19:
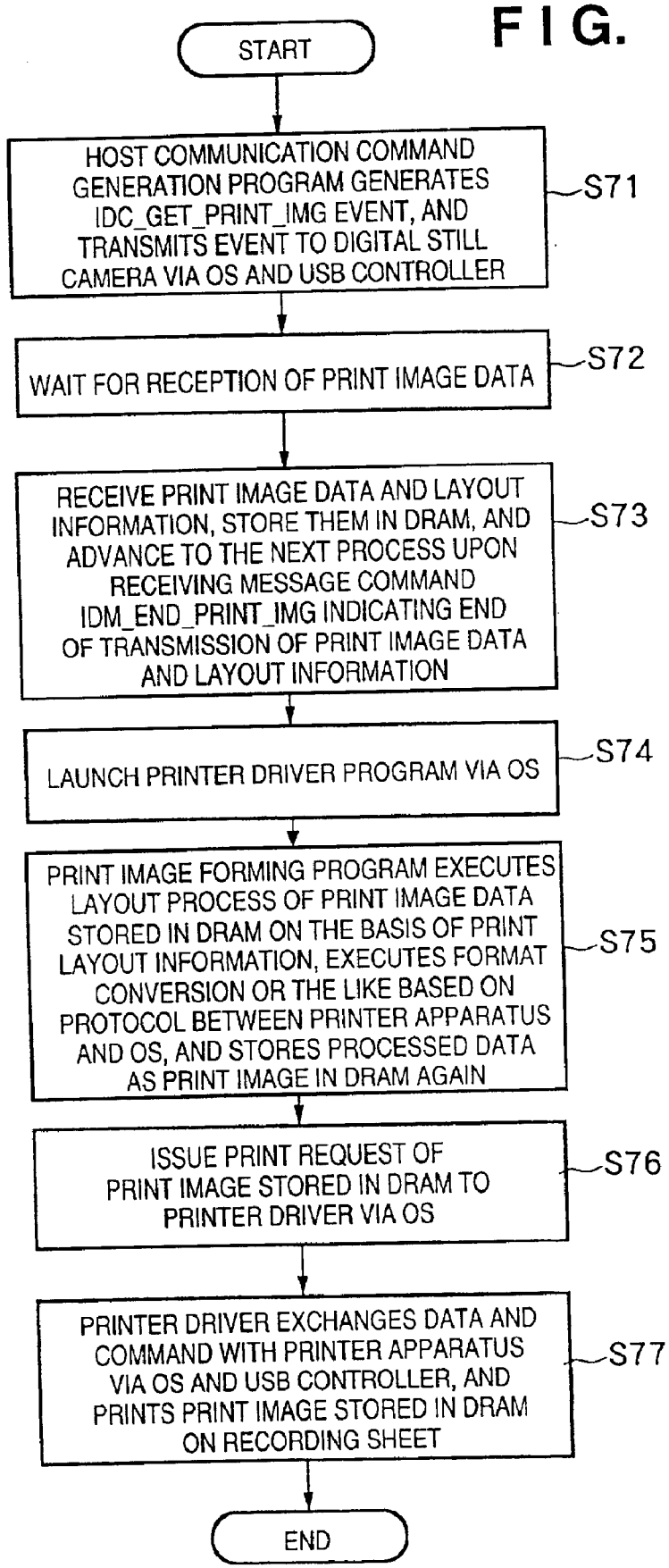
FIG. 19 is a flow chart showing the print sequence in the third embodiment.

FIG. 19 is a flow chart showing the print sequence by the print sequence execution program 308 of the host information processing apparatus 102.

In FIG. 19, since steps S71, S72, S74, S76, and S77 are the same as those (steps S21, S22, S24, S26, and S27) in the print sequence of the first embodiment shown in FIG. 6, the processes in steps S73 and S75 will be explained below.

When reception of print image data has started, print image data transmitted from the camera 101 and layout information transmitted after the print image data are stored in the DRAM 303 in step S73. Upon receiving the message IDM_END_PRINT_IMG indicating the end of transmission of print image data and print layout information, the flow advances to step S74 and the printer driver program is lauched.

In step S75, the print image forming program 309 forms a print image on which print images stored in the DRAM 303 are laid out on one page in accordance with the layout information stored in the DRAM 303, performs format conversion or the like based on the protocol between the printer apparatus 103 and OS 302, and stores the print image in the DRAM 303.

Figure 20:
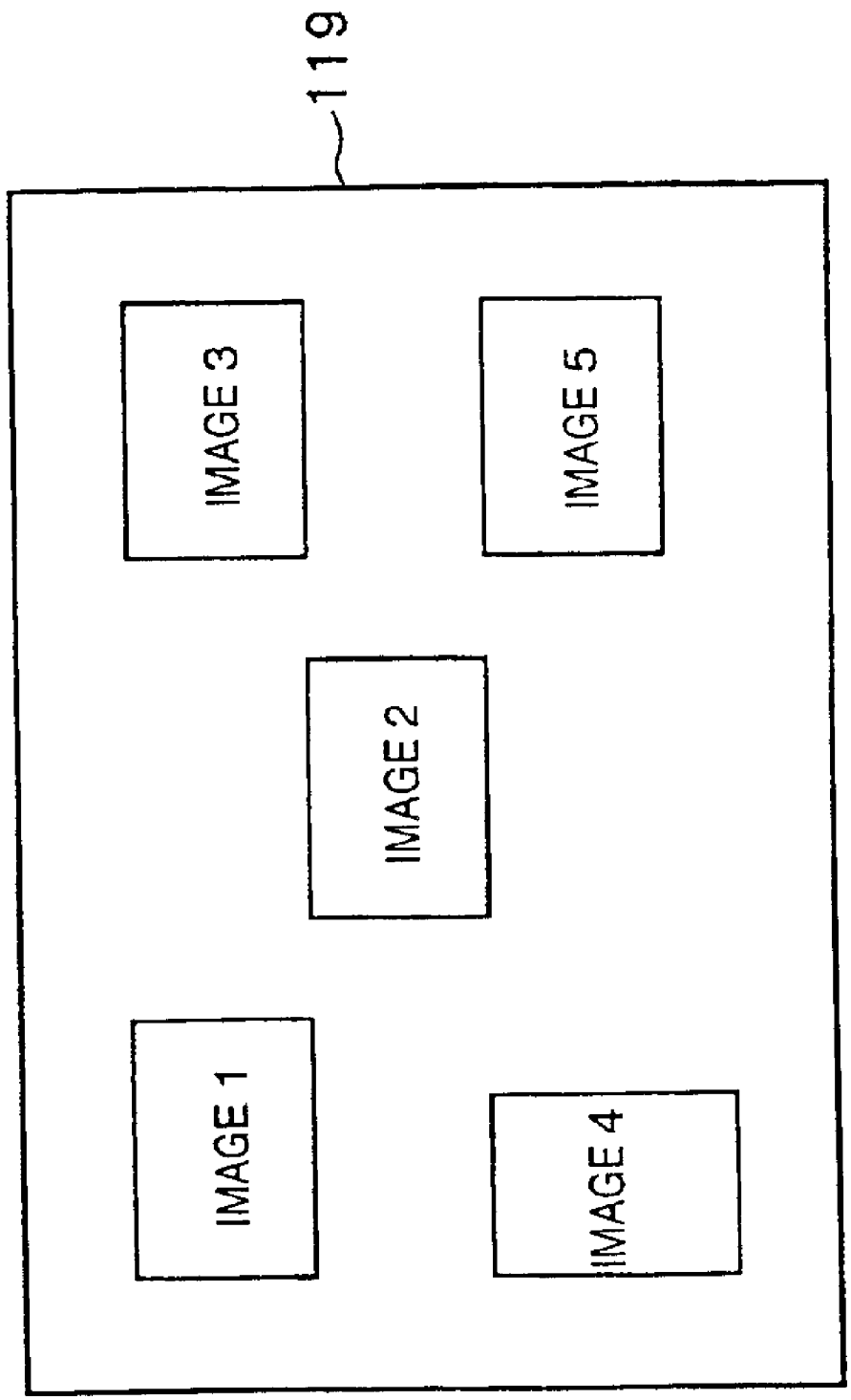
FIG. 20 shows images printed on a recording sheet by the print sequence shown in FIG. 19.

FIG. 20 shows images printed on the recording sheet 119 in the aforementioned print sequence. These images are printed in accordance with the layout shown in FIG. 16.

[Fourth Embodiment]

Arrangement>

Figure 21:
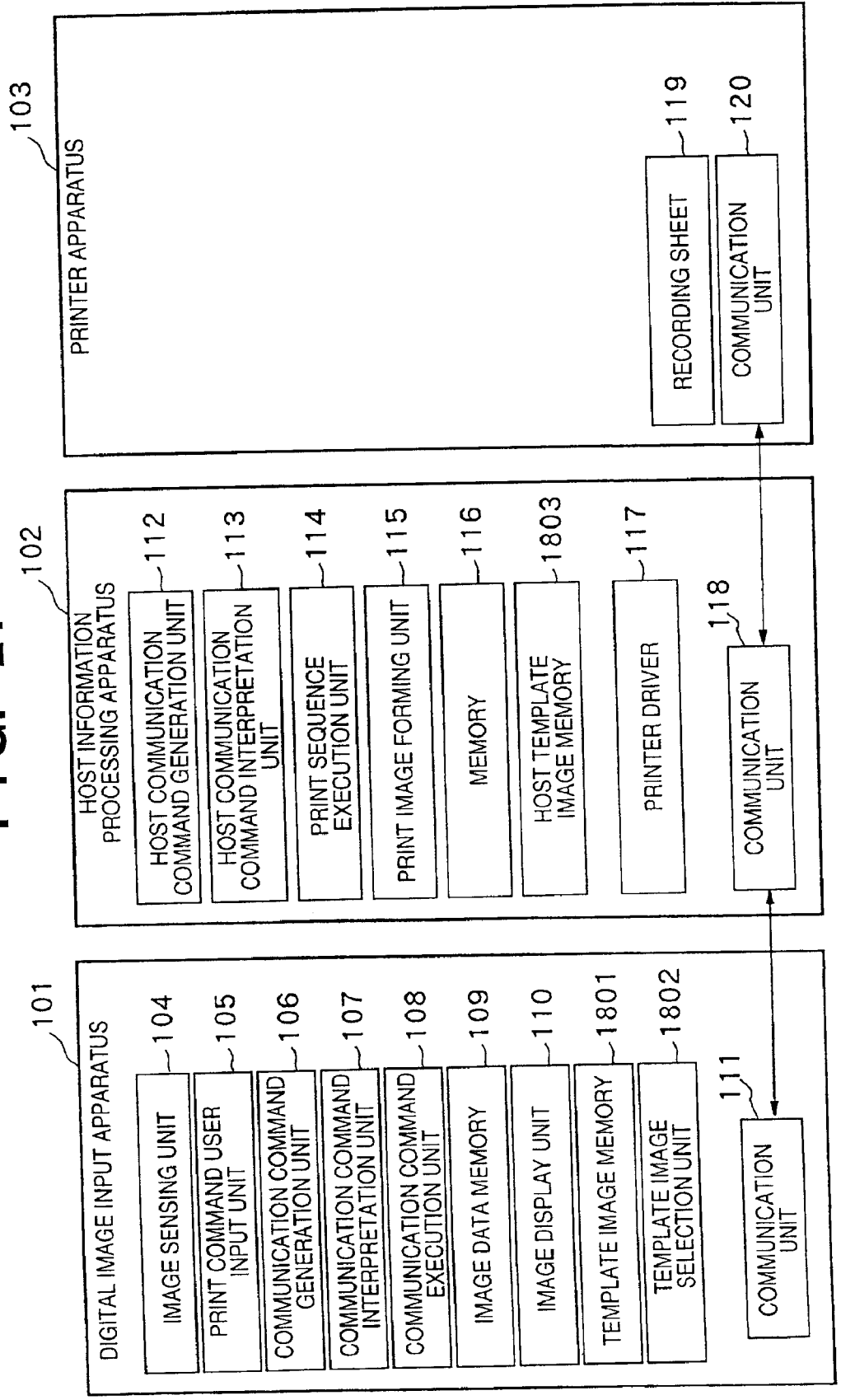
FIG. 21 is a block diagram showing the basic arrangement of an image inputting apparatus and print system according to the fourth embodiment of the present invention.

FIG. 21 is a block diagram showing the basic arrangement of the image inputting apparatus 101 and print system according to the fourth embodiment. The image inputting apparatus 101 of the fourth embodiment comprises a template image memory 1801 for storing a plurality of template images such as a frame image and the like, which fringes an image in the print process, and a template image selection unit 1802 with which the user selects a template image to be used from the plurality of template images, in addition to the arrangement of the first embodiment.

The host information processing apparatus 102 of the fourth embodiment comprises a host template image memory 1803 for storing a template image corresponding to that stored in the template image memory 1801 of the image inputting apparatus 101. Note that both the template image memory 1801 and host template image memory 1803 may store template images actually used in the print process. In the fourth embodiment, the template image memory 1801 stores thumbnail images of template images stored in the host template image memory 1803. The image reduction factor at that time is not particularly limited as long as the resolution that allows the user to visually recognize a template image upon displaying the template image on the image display unit 110 can be maintained. In this manner, the memory size of the template image memory 1801 can be reduced.

Assume that the host information processing apparatus 102 in the fourth embodiment uses a personal computer as in the first embodiment. The block diagram of that personal computer is the same as that used in the first embodiment shown in FIG. 3. However, the processing contents of the print sequence by the print sequence execution program 308, and the print image forming process by the print image forming program 309 are different from those in the first embodiment. Also, in the fourth embodiment, the host template image memory 1803 uses some storage area of the DRAM 303, and is implemented by loading template image files from a hard disk device (not shown in FIG. 3) onto the DRAM 303.

Figure 22:
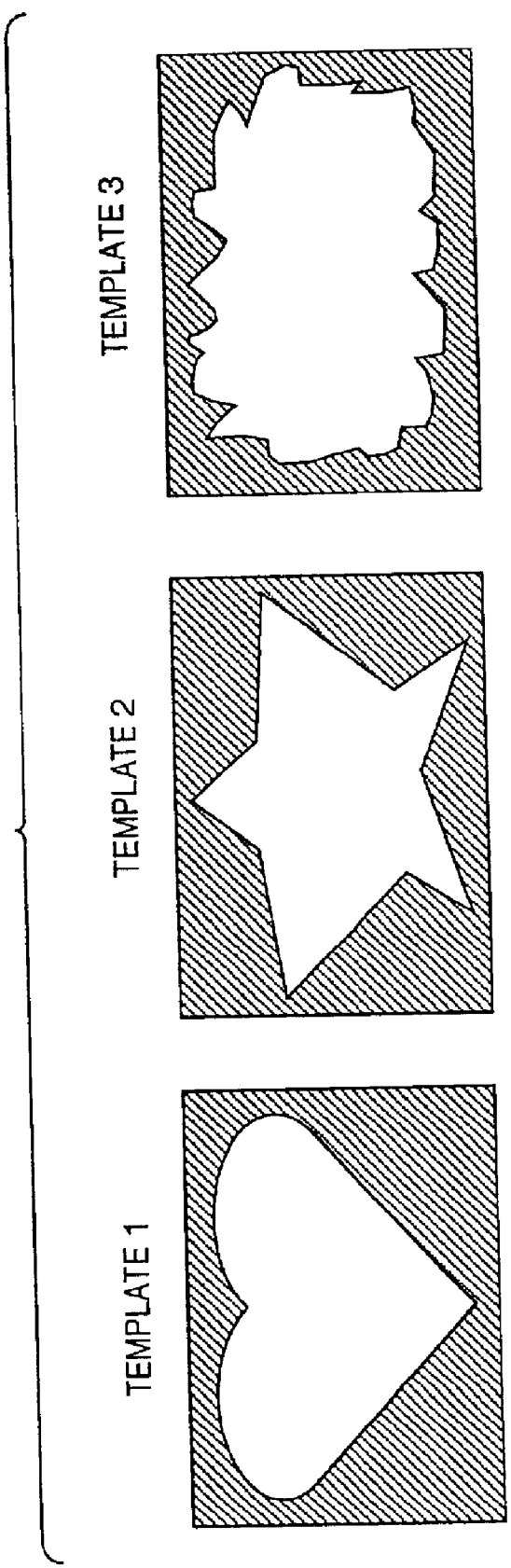
FIG. 22 shows examples of template images.

FIG. 22 shows examples of template images. In the fourth embodiment, three template images Template1, Template2, and Template3 are available.

The outer appearance of the camera 101 of the fourth embodiment is the same as that of the first embodiment shown in FIG. 2. However, in the fourth embodiment, a template select mode can be set by the mode setting dial 202. Upon pressing the "+" or "−" key 204 or 205 in the template select mode, one of Template1 to Template3 stored in the template image memory 1801 is composited with an image, and the composite image is displayed on the LCD 203.

Figure 23:
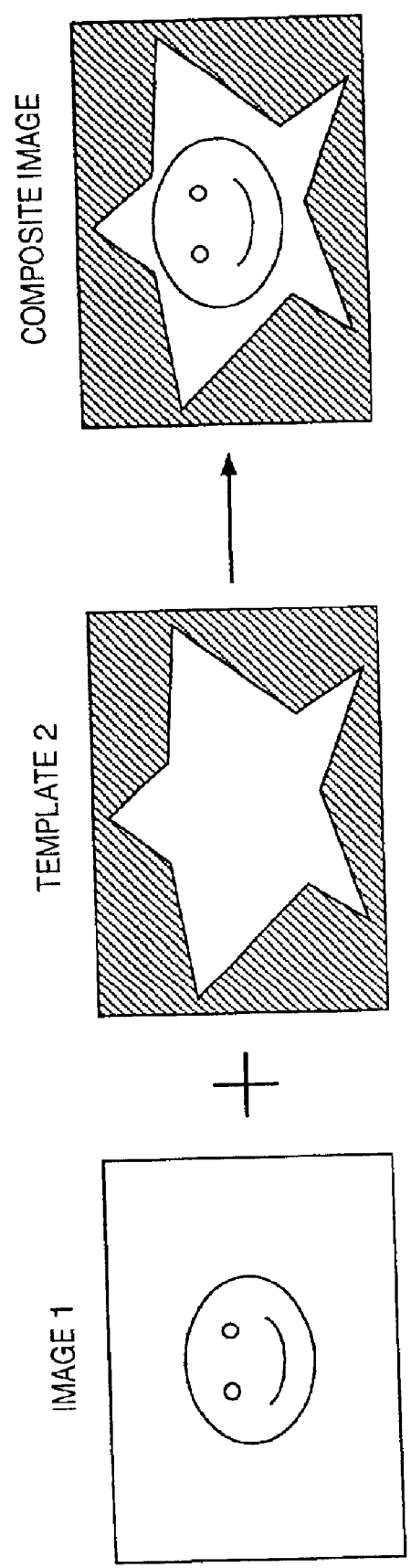
FIG. 23 shows an example of image composition.

FIG. 23 shows an example of image composition in the template select mode. As shown in FIG. 23, image 1 and Template2 are selected, and a composite image of image 1 and Template2 is displayed.

<Issuance of Print Request Event>

Figure 24:
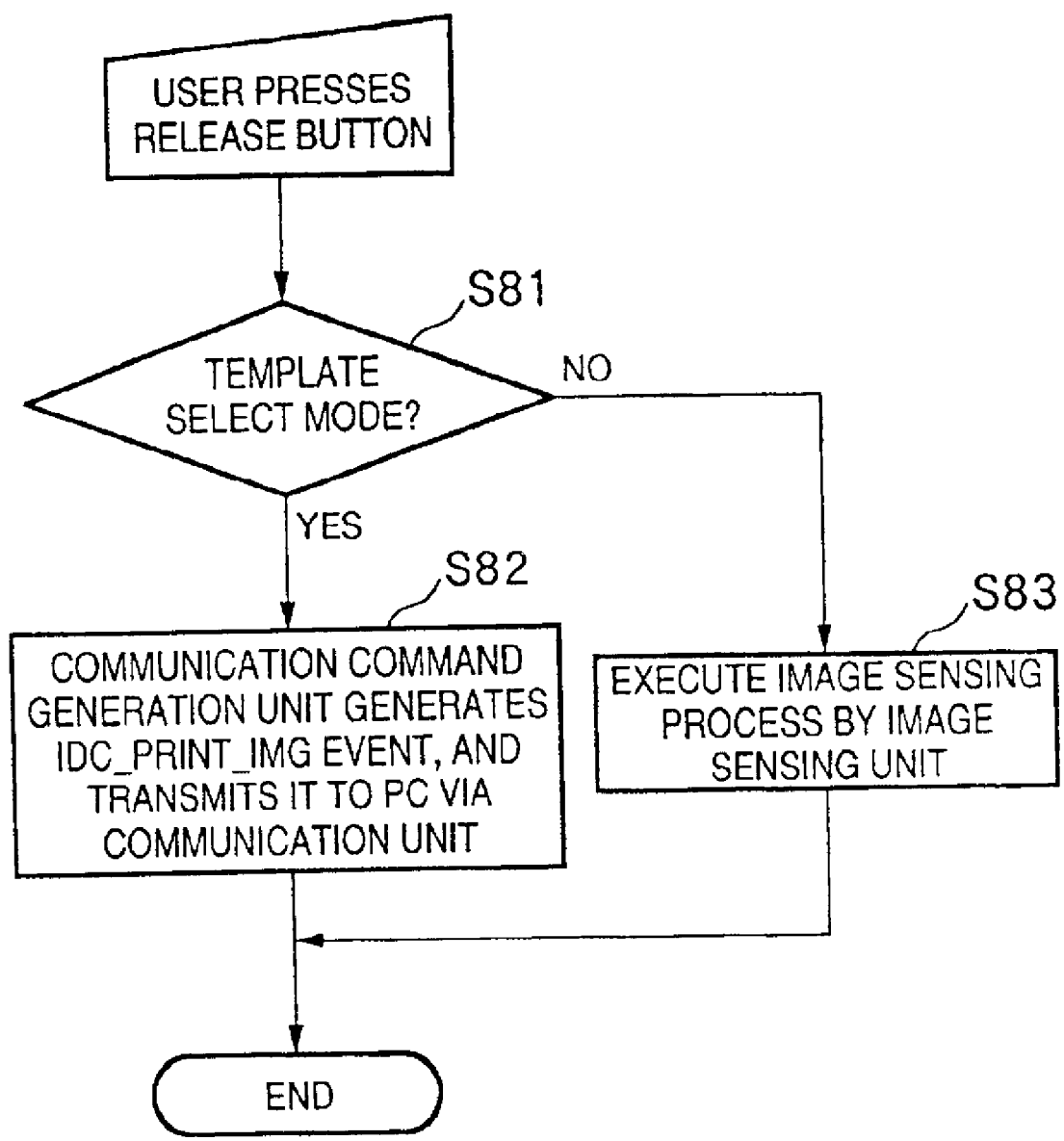
FIG. 24 is a flow chart showing a print request event issuance process in the fourth embodiment.

When the user has pressed the release button 206 while the composite image shown in FIG. 23 is displayed on the LCD 203, the camera 101 executes a print request event issuance process shown in FIG. 24.

It is checked in step S81 if the current mode is the template select mode. If the current mode is the image sensing mode, the image sensing process is done in step S83. If the current mode is the template select mode, the communication command generation unit 106 generates a command (event) IDC_PRINT_IMG indicating a print request and transmits it to the PC 102 via the communication unit 111 in step S82, thus ending the print event issuance process. Of course, if another mode is selected, a process corresponding to that mode is done.

<Transmission of Print Image Data and Template ID>

Figure 25:
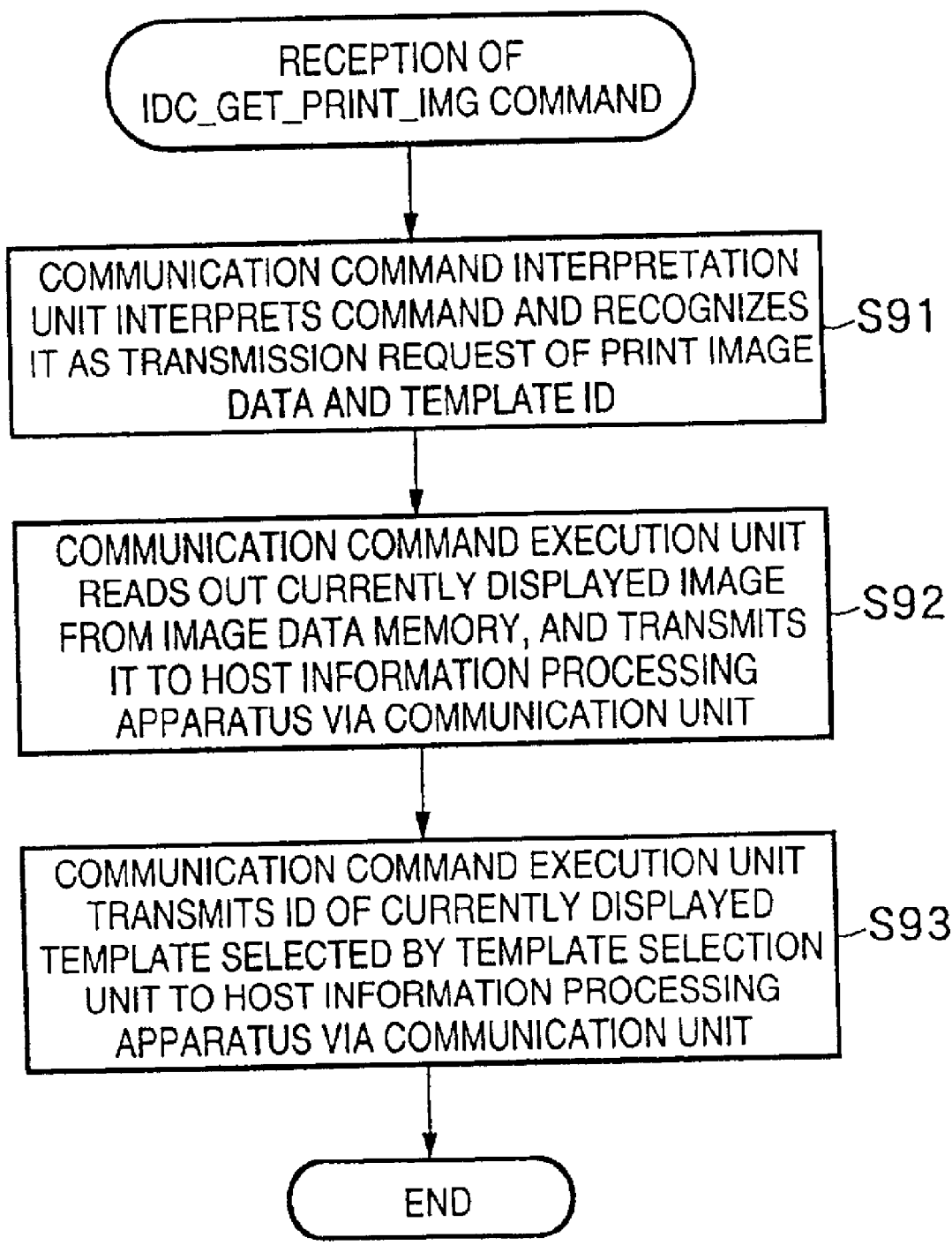
FIG. 25 is a flow chart showing the transmission sequence of print image data and a template ID by the image inputting apparatus of the fourth embodiment.

FIG. 25 is a flow chart showing the transmission sequence of print image data and a template ID by the camera 101.

When the camera 101 receives IDC_GET_PRINT_IMG from the PC 102, the communication command interpretation unit 107 interprets that command in step S91 to recognize that the received command is a transmission request of print image data and a template ID.

The communication command execution unit 108 reads out image data which is currently displayed on the LCD 203 from the image data memory 109, and transmits it to the PC 102 as print image data via the communication unit 111 in step S92.

The communication command execution unit 108 transmits the template ID of a template image which is currently displayed on the LCD 203 to the PC 102 via the communication unit 111 in step S93, thus ending this process.

<Print Sequence>

Figure 26:
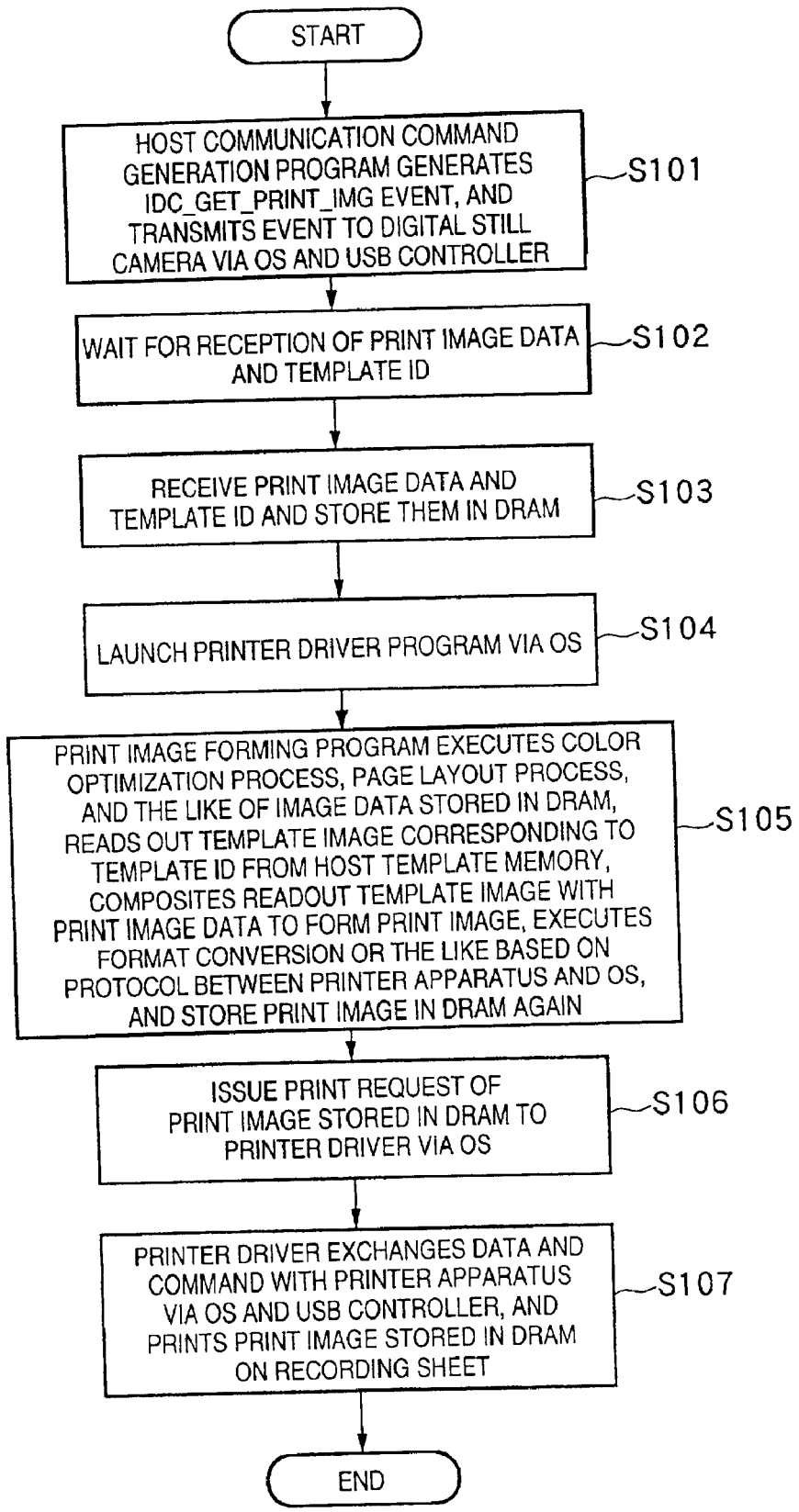
FIG. 26 is a flow chart showing the print sequence in the fourth embodiment.

FIG. 26 is a flow chart showing the print sequence by the print sequence execution program 308 of the PC 102.

In FIG. 26, since steps S101, S104, S106, and S107 are the same as those (steps S21, S24, S26, and S27) in the print sequence of the first embodiment shown in FIG. 26, the processes in steps S102, S103, and S105 will be explained below.

The PC 102 waits for print image data and the ID of a template image to be synthesized received from the camera 101 in step S102. When reception of this data has started, the received print image data and template image ID are stored in the DRAM 303 in step S103. Note that the camera 101 executes the process shown in FIG. 25, and begins to transmit image data and the like to the PC 102, while the print sequence execution program 308 waits for reception of the print image data and template ID in step S102.

In step S105, the print image forming program 309 converts the format of print image data stored in the DRAM 303 into a print image format as the image data format the printer driver program 310 can process, and stores the converted data in the DRAM 303. At this time, an image correction process is executed in consideration of the resolution, and color and density characteristics of the printer 103, and the resolution, and color and luminance characteristics of the camera 101, and a print image is formed in consideration of the layout and sizes of images to be printed.

The processes described so far in step S105 are substantially the same as those in step S5 in the first embodiment. However, in the fourth embodiment, a template image corresponding to the template ID stored in the DRAM 303 is read out from the DRAM 303 and is composited with print image data read out from the DRAM 303, thus forming a print image. Note that the composition process in the fourth embodiment can be the same as that of a plurality of images as a function of photoretouch software for a personal computer.

Figure 27:
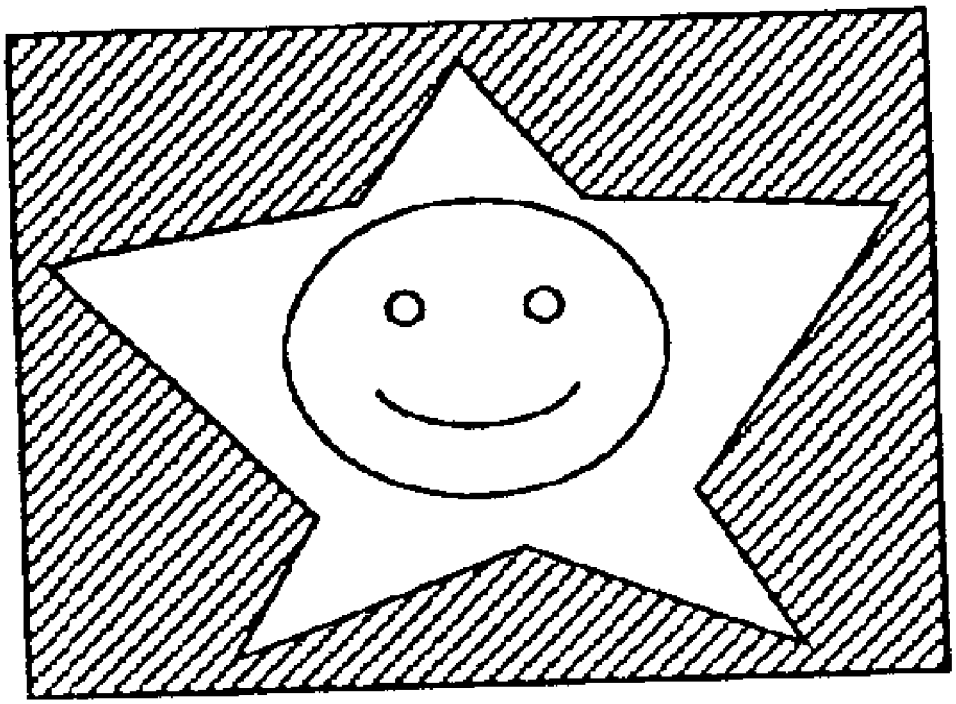
FIG. 27 shows a composite image printed on a recording sheet by the print sequence shown in FIG. 26.

FIG. 27 shows a composite image printed on the recording sheet 119 by the aforementioned print sequence. As shown in FIG. 27, an image which is the same as that displayed on the LCD 203 when the user has pressed the release button 206 is printed.

In recent years, as a standard format for setting an image to be printed from sensed images on a digital camera, and storing that setting information together with the image, DPOF® (digital print order format) has been specified.

Since a digital camera that complies with this format has a print setting function, if the aforementioned embodiment is implemented using a print setting window of that camera, image process operations become easy and convenient for the user.

In a host that has a program for recognizing such DPOF setting information, when another program for the color correction process or layout process disclosed in the above embodiment is launched and executed in response to recognition of the DPOF setting information, the need for troublesome image process operations by the user can be obviated.

For example, if the DPOF setting information includes lightness correction information, a series of processes for launching, operating, and quitting a program that performs lightness correction can be automatically done, and troublesome operations of the user can be omitted.

As many apparently widely different embodiments of the present invention can be made without departing from the spirit and scope thereof, it is to be understood that the invention is not limited to the specific embodiments thereof except as defined in the appended

What is claimed is:

1. An image inputting apparatus comprising:
   a capture section, arranged to capture an image;
   a storage controller, arranged to store the captured image in memory;
   a communication section, arranged to communicate with an information processing apparatus to which a printer is connected;
   an inputting section, arranged to input a print request of the captured or stored image; and
   a setting section, arranged to set a display property which defines image processing to be applied to an image by the information processing apparatus,
   wherein said communication section transmits a print execution instruction, the captured or stored image to be printed, and the display property to the information processing apparatus when said inputting section inputs the print request.

2. The image inputting apparatus according to claim 1, wherein said image inputting apparatus is a digital still camera.

3. The image inputting apparatus according to claim 1, wherein said communication section communicates via a serial bus.

4. The image inputting apparatus according to claim 1, further comprising:
   a display arranged to display the captured or stored image,
   wherein said communication section transmits an image corresponding to the image displayed on said display as an image to be printed to the information processing apparatus.

5. The image inputting apparatus according to claim 1, wherein the display property is at least one of a lightness, gains of respective color components, contrast, color temperature, and gamma value.

6. The image inputting apparatus according to claim 1, further comprising:
   a layout setter arranged to set a layout upon printing an image,
   wherein said communication section transmits the set layout together with the image to be printed to the information processing apparatus.

7. The image inputting apparatus according to claim 6, further comprising:
   a display section arranged to display a pointing cursor together with the captured or stored image, to set the layout by moving the pointing cursor using said layout setter.

8. The image inputting apparatus according to claim 1, further comprising:
   a storage, arranged to store information indicating a plurality of template images which can be synthesized with the captured or stored image; and
   a selector, arranged to select a template image to be synthesized, wherein said communication section transmits information indicating the selected template image together with the image to be printed.

9. The image inputting apparatus according to claim 8, wherein said storage stores thumbnail images of the template images.

10. The image inputting apparatus according to claim 1, further comprising:
an editing setter arranged to set an edit process of an image,
wherein said communication section sends edit process information indicating the set edit process together with the image to be printed to the information processing apparatus.

11. The image inputting apparatus according to claim 10, wherein the information processing apparatus launches a program corresponding to contents of the edit process indicated by the received edit process information.

12. The image inputting apparatus according to claim 10, wherein the edit process information has a digital print order format.

13. An information processing apparatus comprising:
a communication section, arranged to receive a print execution instruction, an image to be printed, and a display property from an image inputting apparatus;
a processor, arranged to perform image processing defined by the received display property on the received image; and
a controller, arranged to issue a print request of the processed image and to transmit the processed image to a connected printer.

14. The information processing apparatus according to claim 13, wherein the image inputting apparatus is a digital still camera.

15. The information processing apparatus according to claim 13, wherein said communication section communicates via a serial bus.

16. The information processing apparatus according to claim 13, wherein the image processing is at least one of luminance correction, color correction, error diffusion, dithering, gain correction in units of color components, contrast correction, and gamma correction.

17. The information processing apparatus according to claim 13, wherein said processor generates image data as to the processed image in accordance with layout information received from the image inputting apparatus together with the image to be printed.

18. The information processing apparatus according to claim 13, further comprising:
a storage arranged to store a plurality of template images which can be synthesized with an image,
wherein said processor generates image data as the processed image by synthesizing the received image with a template image which is read from said storage in accordance with information received from the image inputting apparatus together with the image to be printed.

19. A printing system comprising an image inputting apparatus and an information processing apparatus, wherein said image inputting apparatus comprises:
a capture section, arranged to capture an image;
a storage controller, arranged to store the captured image in memory;
a first communication section, arranged to with said information processing apparatus;
an inputting section, arranged to input a print request of the captured or stored image; and
a setting section, arranged to set a display property which defines image processing to be applied to an image by said information processing apparatus,
wherein said information processing apparatus comprises:
a second communication section, arranged to receive a print execution instruction, an image to be printed, and the display property from said image inputting apparatus;
a processor, arranged to perform the image processing defined by the received display property on the received image; and
a controller, arranged to a print request of the processed image and to transmit the processed image to a connected printer, and
wherein said first and second communication sections execute a communication for exchanging the print execution instruction, the image to be printed, and the display property when said inputting section inputs the print request.

20. A controlling method of an image inputting apparatus which comprises a capture section arranged to capture an image, a storage controller arranged to store the captured image in memory, and a communication section arranged to communicate with an information processing apparatus to which a printer is connected, said method comprising the steps of:
setting a display property which defines image processing to be applied to an image by the information processing apparatus,
inputting a print request of the captured or stored image; and
transmitting a print execution instruction, the captured or stored image to be printed, and the display property to the information processing apparatus using the communication section on the basis of the print request.

21. An information processing method comprising the steps of:
receiving a print execution instruction, an image to be printed, and a display property from an image inputting apparatus;
performing image processing defined by the received display property on the received image;
issuing a print request of the processed image to a connected printer; and
transmitting the processed image to the printer.

22. A computer program product storing a computer readable medium comprising a computer program, for a controlling method of an image inputting apparatus which comprises a capture section arranged to capture an image, a storage controller arranged to store the captured image in memory, and a communication section arranged to communicate with an information processing apparatus to which a printer is connected, said controlling method comprising the steps of:
setting a display property which defines image processing to be applied to an image by the information processing apparatus;
inputting a print request of the captured or stored image; and
transmitting a print execution instruction, the captured or stored image to be printed, and the display property to the information processing apparatus using the communication section on the basis of the print request.

23. A computer program product storing a computer readable medium comprising a computer program for an information processing method, said information processing method comprising the steps of:

receiving a print execution instruction, an image to be printed, and a display property from an image inputting apparatus;

performing image processing defined by the received display property on the received image;

issuing a print request of the processed image to a connected printer; and transmitting the processed image to the printer.

* * * * *

UNITED STATES PATENT AND TRADEMARK OFFICE
CERTIFICATE OF CORRECTION

PATENT NO. : 6,867,882 B1 Page 1 of 1
APPLICATION NO. : 09/598767
DATED : March 15, 2005
INVENTOR(S) : Fumiaki Takahashi It is certified that error appears in the above-identified patent and that said Letters Patent is hereby corrected as shown below:

COLUMN 6:
Line 40, "Window 98®" should read --Windows 98®--.
Line 43, "Window 98®" should read --Windows 98®--.
Line 65, "Window 98®" should read --Windows 98®--.

COLUMN 13:
Line 45, "lauched." should read --launched.--.
Line 57, "Arrangement>" should read --<Arrangement>--.

COLUMN 16:
Line 10, "appended" should read --appended claims.--.

COLUMN 17:
Line 66, "to" should read --to communicate--.

COLUMN 18:
Line 14, "to" should read --to issue--.
Line 32, "apparatus," should read --apparatus;--.
Line 50, "program, for" should read --program for--.

Signed and Sealed this

Twenty-first Day of August, 2007

JON W. DUDAS
*Director of the United States Patent and Trademark Office*